(12) United States Patent
Martino

(10) Patent No.: US 12,410,885 B2
(45) Date of Patent: Sep. 9, 2025

(54) CEILING MOUNTED PLASTIC STORAGE BIN HOLDER

(71) Applicant: Marc Gregory Martino, Westlake Village, CA (US)

(72) Inventor: Marc Gregory Martino, Westlake Village, CA (US)

( * ) Notice: Subject to any disclaimer, the term of this patent is extended or adjusted under 35 U.S.C. 154(b) by 0 days.

(21) Appl. No.: 18/668,165

(22) Filed: May 18, 2024

(65) Prior Publication Data

US 2024/0328577 A1 Oct. 3, 2024

Related U.S. Application Data

(63) Continuation-in-part of application No. 17/648,701, filed on Jan. 24, 2022, now Pat. No. 11,988,327.

(60) Provisional application No. 63/141,043, filed on Jan. 25, 2021.

(51) Int. Cl.
*F16M 13/02* (2006.01)
*A47B 95/00* (2006.01)

(52) U.S. Cl.
CPC ......... *F16M 13/027* (2013.01); *A47B 95/008* (2013.01)

(58) Field of Classification Search
CPC ....... F16M 13/027; A47B 95/008; E04B 9/20; E04B 9/183; E04B 9/18
USPC ...................................................... 248/294.1
See application file for complete search history.

(56) References Cited

U.S. PATENT DOCUMENTS

| | | | | |
|---|---|---|---|---|
| 790,337 | A * | 5/1905 | Adams | A47G 25/90 223/111 |
| 2,007,039 | A * | 7/1935 | Dickson | A45F 5/1026 294/170 |
| 3,452,957 | A * | 7/1969 | Zuelsdorf | D06F 95/002 248/303 |
| 4,101,107 | A * | 7/1978 | Antoszewski | F16M 13/02 248/291.1 |
| 4,256,420 | A * | 3/1981 | Day | B23B 47/287 408/115 R |
| D286,931 | S * | 11/1986 | Conklin | D34/27 |
| 4,740,043 | A * | 4/1988 | Kennamer | B65F 1/14 312/211 |
| D393,132 | S * | 3/1998 | Baker | D34/27 |
| 6,823,999 | B2 * | 11/2004 | Heneveld, Sr. | A47B 96/02 211/100 |
| 7,669,822 | B2 * | 3/2010 | Kluge | F16B 45/00 248/306 |

(Continued)

*Primary Examiner* — Ko H Chan
(74) *Attorney, Agent, or Firm* — Orbit IP

(57) ABSTRACT

A plurality of brackets and hooks form a kit of ceiling mounted devices configured for removably storing plastic container bins and totes. Each bracket has a channel disposed below a top plane where the bracket is configured to abut against an underside of a ceiling. Each hook has an axle configured to be pivotably captured by the channel, where at least one prong extends from and is connected to the hook. The at least one prong extends upwards when the hook is pivotably hanging from the bracket when the bracket is attached to the underside of the ceiling. The axle of the hook is configured to be pivotably disposed within the channel of the bracket. The at least one prong is configured to removably capture a rim of the plastic storage/container bin. The hook may be a metal rod or tube bent during manufacture.

20 Claims, 23 Drawing Sheets

(56) References Cited

U.S. PATENT DOCUMENTS

| | | | | |
|---|---|---|---|---|
| 8,840,080 B1 | * | 9/2014 | Gordon | F16M 13/02 |
| | | | | 248/544 |
| 8,864,095 B1 | * | 10/2014 | Marks | A47G 1/16 |
| | | | | 248/323 |
| D736,575 S | * | 8/2015 | Tufford | D7/669 |
| D913,777 S | * | 3/2021 | Liu | D8/370 |
| 11,266,261 B1 | * | 3/2022 | Shoemaker, Jr. | A47G 29/00 |
| D957,237 S | * | 7/2022 | Zhang | D8/367 |
| D1,022,668 S | * | 4/2024 | Shirley | D8/370 |
| 2015/0016907 A1 | * | 1/2015 | Frick | B25H 7/02 |
| | | | | 33/485 |

\* cited by examiner

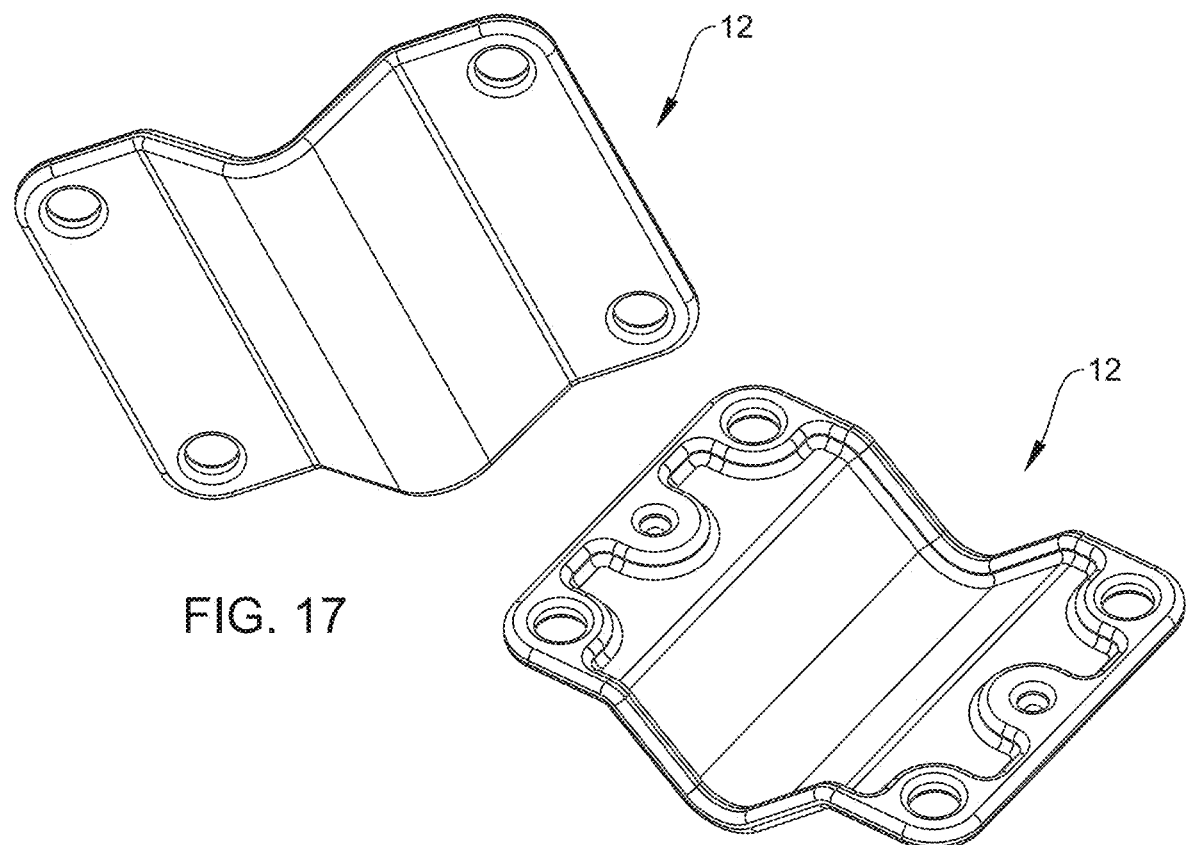
FIG. 17
FIG. 18
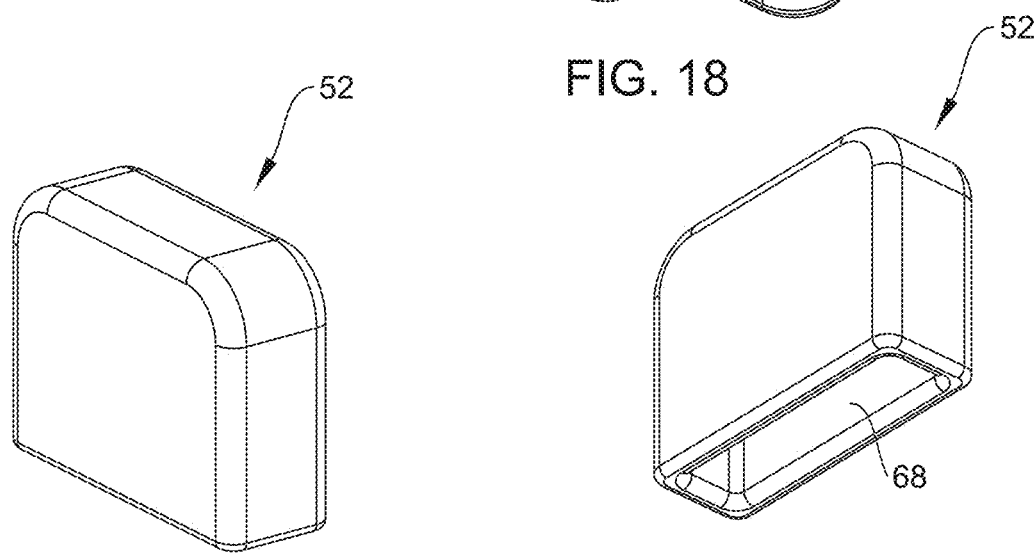
FIG. 19
FIG. 20

CEILING MOUNTED PLASTIC STORAGE BIN HOLDER

CROSS-REFERENCE TO RELATED APPLICATIONS

This continuation-in-part application claims priority to non-provisional application Ser. No. 17/648,701 filed on Jan. 24, 2022 and issued as U.S. Pat. No. 11,988,327 on May 21, 2024, which itself claimed priority to provisional application 63/141,043, filed Jan. 25, 2021, the entire contents of which all applications are hereby incorporated in full by these references.

FIELD OF THE INVENTION

The present invention generally relates to storage solutions. More particularly, the present invention relates to a set of ceiling mounted hooks that removably capture a variety of plastic storage bins in the marketplace.

BACKGROUND OF THE INVENTION

Lack of storage is a problem for many people in the United States and worldwide. It is common to see large metal frames installed hanging from the ceilings of garages such that infrequently used items can be stored thereon freeing up floor space within the house. However, these metal frames are hard to install as they usually require two people for installation and must be screwed into the studs for support. At the same time, many consumers have plastic storage/container bins that are used to store such infrequently used items. (The use of the terms "plastic storage bin" and "plastic container bin" are synonymous). Thus, it is common to store the plastic storage bins on the metal frames. Yet, the metal frames cannot hold a large number of plastic bins as space is quickly utilized within the metal framing. Furthermore, each plastic storage bin is not overly heavy even when filled, as one does not want to be lifting an overly heavy object above one's head. Taking all of these factors into consideration, there exists a need for another storage solution that attaches directly to the drywall which can easily secure these plastic storage bins in a large number for improved storage capacity. The present invention fulfills these needs and provides other related advantages.

SUMMARY OF THE INVENTION

As previously taught in provisional 63/141,043, filed Jan. 25, 2021, FIGS. 13-18 of the '043 provisional depict another invention called by the inventor as HoverHooks, which was previously called SkyHooks. Each SkyHook is made of up two parts. First, a bracket is shown in FIGS. 14-15. The bracket is configured to attach to the ceiling drywall with drywall screws. The bracket has a curved middle portion which is configured to pivotably accept the hook as shown in FIGS. 16-17. The hooks are loosely held in the brackets such that the hooks can swing back and forth.

Each bracket is small enough such that it can slip within the rectangular-shaped aperture of the hook. The hook itself has a cylindrically-shaped pivot adjacent to the aperture. The bracket slips through the aperture such that the cylindrically-shaped pivots rests within the middle portion of the bracket. This then creates the pivotable connection once the bracket is installed onto the ceiling.

The upward extending ends near the bottom of the hooks have an upward shaped extension that is configured to attach/capture the bottom of a container lip. Most plastic bins and containers have lips that the SkyHook can hold onto. This is best seen in FIG. 18 where multiple SkyHooks are shown holding a multitude of clear plastic bins. The upward extension fits nicely within a range of the lips of these plastic bins, such that almost every plastic bin manufactured today can utilize the SkyHooks.

To install a plastic bin, at least two, but usually four sets of SkyHooks are used to capture the bin in place. The center of gravity of each hook is configured to rotate the hook towards the bin, such that each hook has a tendency to always close onto the bin. This helps securing a bin and also helps keeps the hooks in place even when the bin is bumped or moved. During bin attachment, it is easy to push the hooks to pivot outwardly and then allow the hook to naturally pivot back to capture the bin under the lip. A bin can be secured and removed within seconds.

Another embodiment of the ceiling mounted device (10) configured for removably storing a plastic storage bin (11) is disclosed herein. The ceiling mounted device comprises a bracket (12) and a hook (20). The bracket comprises a first end (13) opposite a second end (14) having a channel (15) disposed therebetween, wherein the first end and the second end mutually define a top plane (16) configured to abut against an underside (17) of a ceiling (18). The channel is disposed below the top plane. The channel is open towards the top plane. The channel defines a pivot axis (19). The hook comprises an axle (21) defining a longitudinal axis (22), the axle extending between a first arm (23) disposed opposite to a second arm (24), the first arm connecting to the second arm at a spine (25), wherein the first arm, the second arm, the spine and the axle delimit an aperture (26). At least the first end and/or the second end of the bracket is configured to pass through the aperture of the hook, wherein the axle of the hook is configured to be disposed within the channel aligning the pivot axis and the longitudinal axis. The hook is pivotably attached to the bracket when the axle is disposed within the channel when the bracket is mounted to the underside of the ceiling. At least one prong (27) extends from and is connected to the spine and/or the first and second arms, wherein the at least one prong extends upwards when the hook is pivotably hanging from the bracket when the bracket is attached to the underside of the ceiling. The at least one prong is configured to removably capture a rim (28) of the plastic storage bin.

In other exemplary embodiments the first end, the channel and the second end may be integrally formed as one part comprising the bracket, and wherein the axle, the first arm, the second arm, the spine and the at least one prong are integrally formed as one part comprising the hook, wherein the bracket and the hook are separate parts configured to cooperatively work together to form the ceiling mounted device. The bracket and hook may be both injection molded plastic parts.

The bracket may comprise a first bracket and a second bracket and the hook may comprise a first hook and a second hook, wherein the first hook is pivotably attached to the first bracket and the second hook is pivotably attached to the second hook, wherein the first and second hooks and brackets are configured to cooperatively work for removably storing the plastic storage bin to the underside of the ceiling.

The first end and the second end of the bracket may each have at least one hole or slot (29) disposed therethrough configured to receive a fastener (30). The at least one prong may extends towards the axle.

The at least one prong may comprise at least two prongs (27a, 27b) spaced a distance (51) apart from one another.

A center (28) of a top surface (29) of the at least one prong may be vertically aligned with the longitudinal axis of the axle defining a vertical plane (30).

At least a portion of the spine may be disposed a first distance (31) from the vertical plane, wherein a center of gravity (32) of the hook may be disposed a second distance (33) from the vertical plane, wherein the second distance is less than the first distance.

A fastener marking tool (34) may be associated with the ceiling mounted device, the fastener marking tool comprising at least one template tool (35) having a first elongated slotted extension (36) and at least one transverse tool (37) being a second elongated slotted extension (38), wherein the at least one template tool is configured to be mounted perpendicular to the at least one transverse tool with a fastener (39) being disposed through the first and second elongated extensions.

The at least one template tool may have at least one hole or slot (40) that matches a spacing of the at least one hole or slot of the bracket.

The at least one template tool may have a plurality of first locks (41) disposed in an upper surface (42) of the first elongated slotted extension, wherein the at least one transverse tool has a plurality of second locks (43) disposed on an upper surface (44) of the second elongated slotted extension, wherein the plurality of first locks and second locks are configured to engage with one another when brought into engagement preventing movement of the at least one template tool relative to the at least one transverse tool while keeping the at least one template tool perpendicular to the at least one transverse tool.

The at least one hole or slot of the at least one template tool may define a centerline (45) extending parallel to the first elongated slotted extension, wherein the first elongated slotted extension is disposed on one side of the centerline and does not reside on the other side of the centerline.

The at least one template tool may have a window aperture (46) disposed therethrough that corresponds to the pivot axis of the bracket when the at least one hole or slot of the at least one template tool matches to the at least one hole or slot of the bracket.

The at least one template tool may include a nail hole (47) configured to receive a nail (50), and wherein the at least one template tool includes a hook feature (48) configured to enable a rubber band (49) to engage it while also engaging the nail when disposed within the nail hole. A plurality of nails and a plurality of rubber bands may be included.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 17 is another isometric view of just the bracket structure of FIG. 12;

FIG. 18 is another isometric view of just the bracket structure of FIG. 12;

FIG. 19 is another isometric view of just the rubber tip structure of FIG. 12;

FIG. 20 is another isometric view of just the rubber tip structure of FIG. 12;

DETAILED DESCRIPTION OF THE PREFERRED EMBODIMENTS

Figure 29:
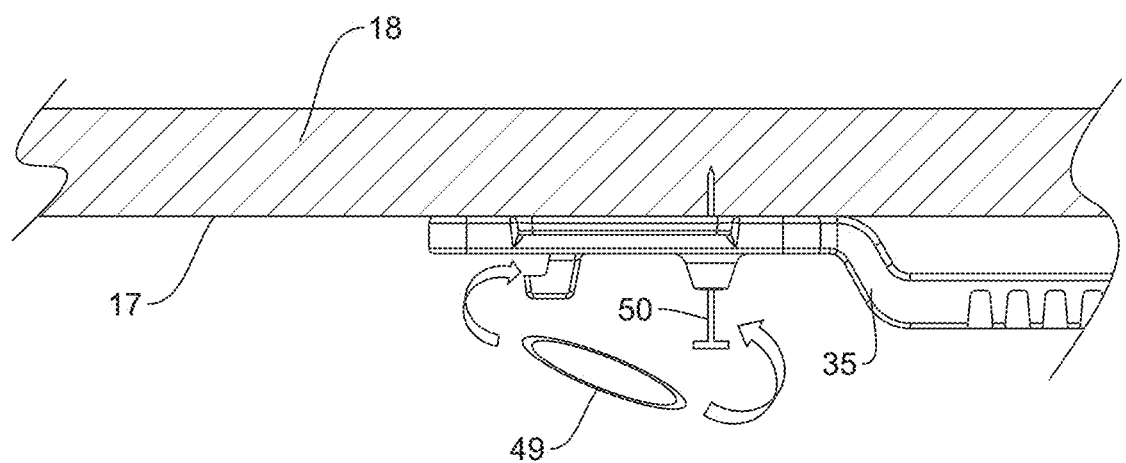
FIG. 29 is a partial sectional side view of a ceiling showing the template tool of FIG. 22 in action.
Figure 30:
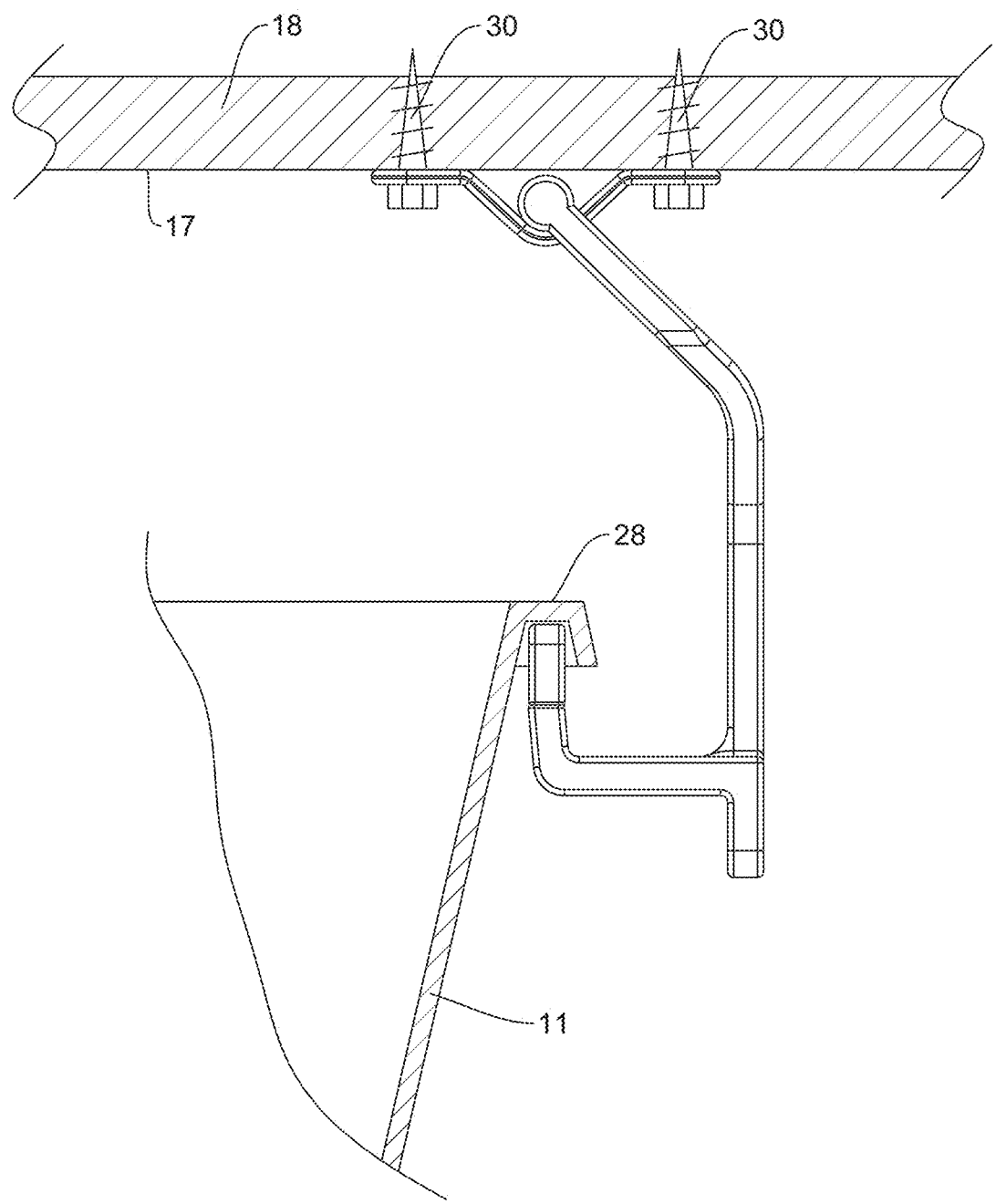
FIG. 30 is a partial sectional side view of a ceiling and plastic storage bin showing the ceiling mounted device of the present invention in action.
Figure 31:
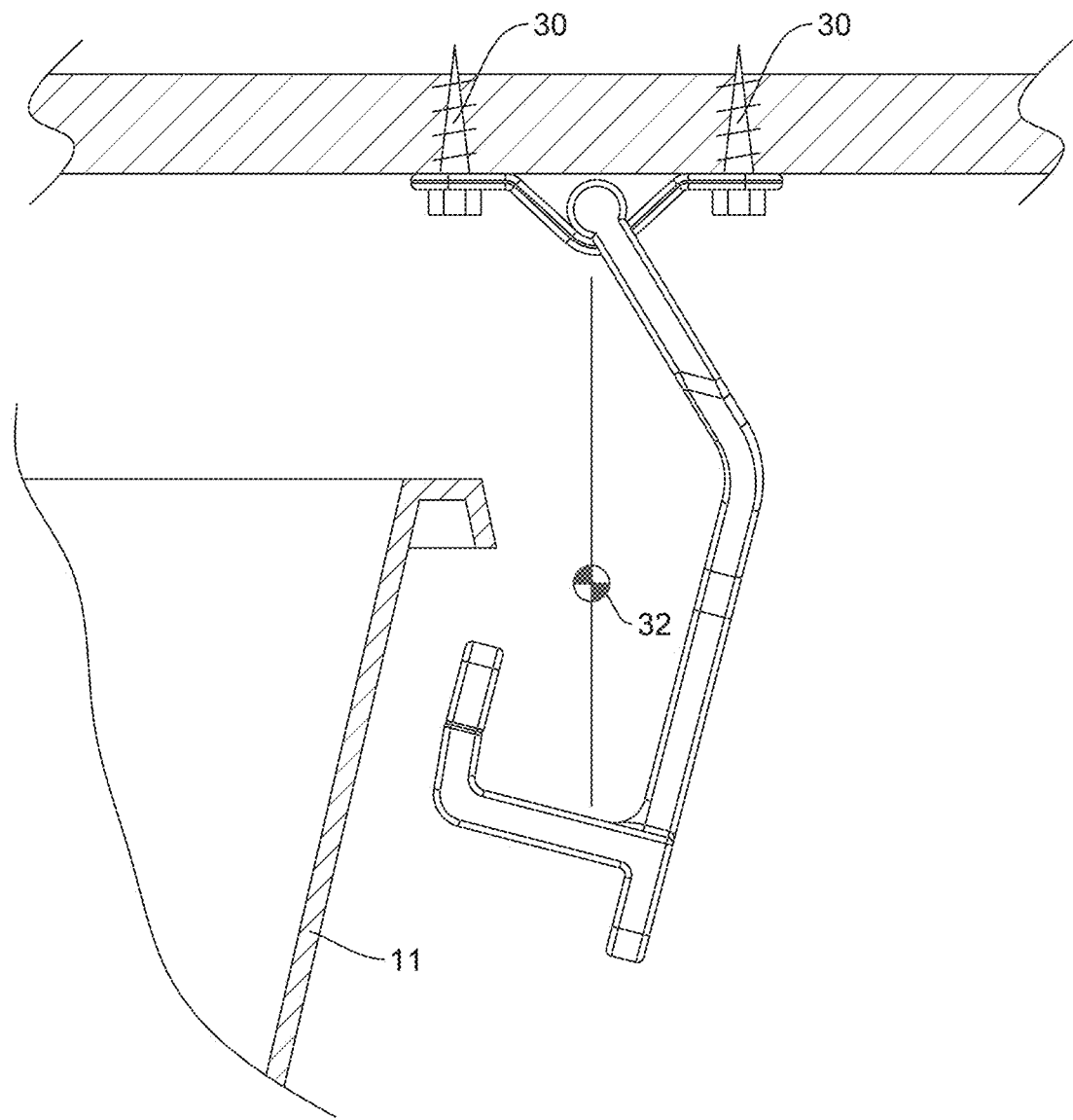
FIG. 31 is a view similar to FIG. 30 now showing how the hook naturally biases towards to the plastic storage bin when not attached to the plastic storage bin due to its center of gravity.
Figure 32:
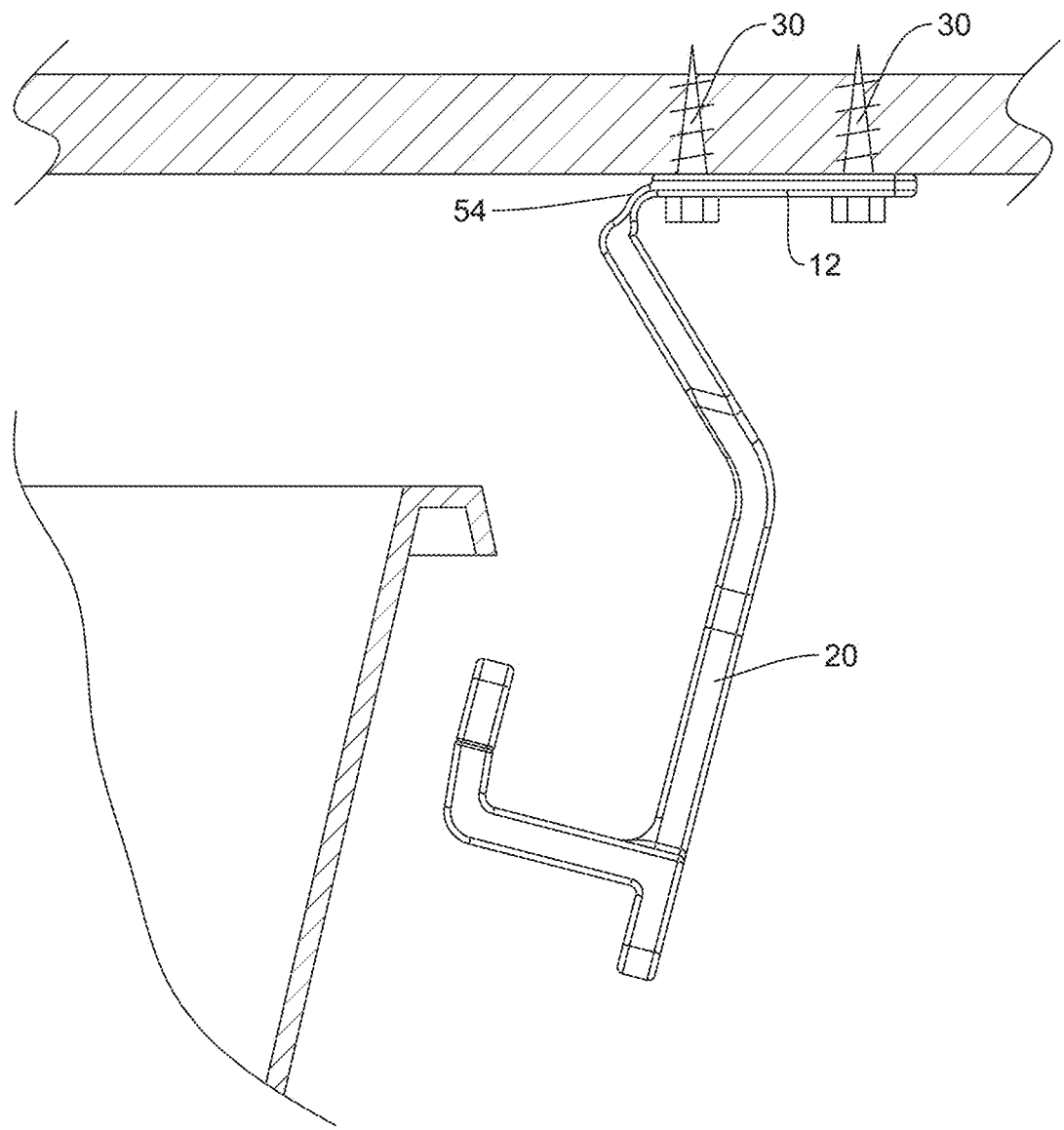
FIG. 32 is a view similar to 31 now showing that the hook and bracket can be manufactured as one integrally formed part through the use of a living hinge.
Figure 33:
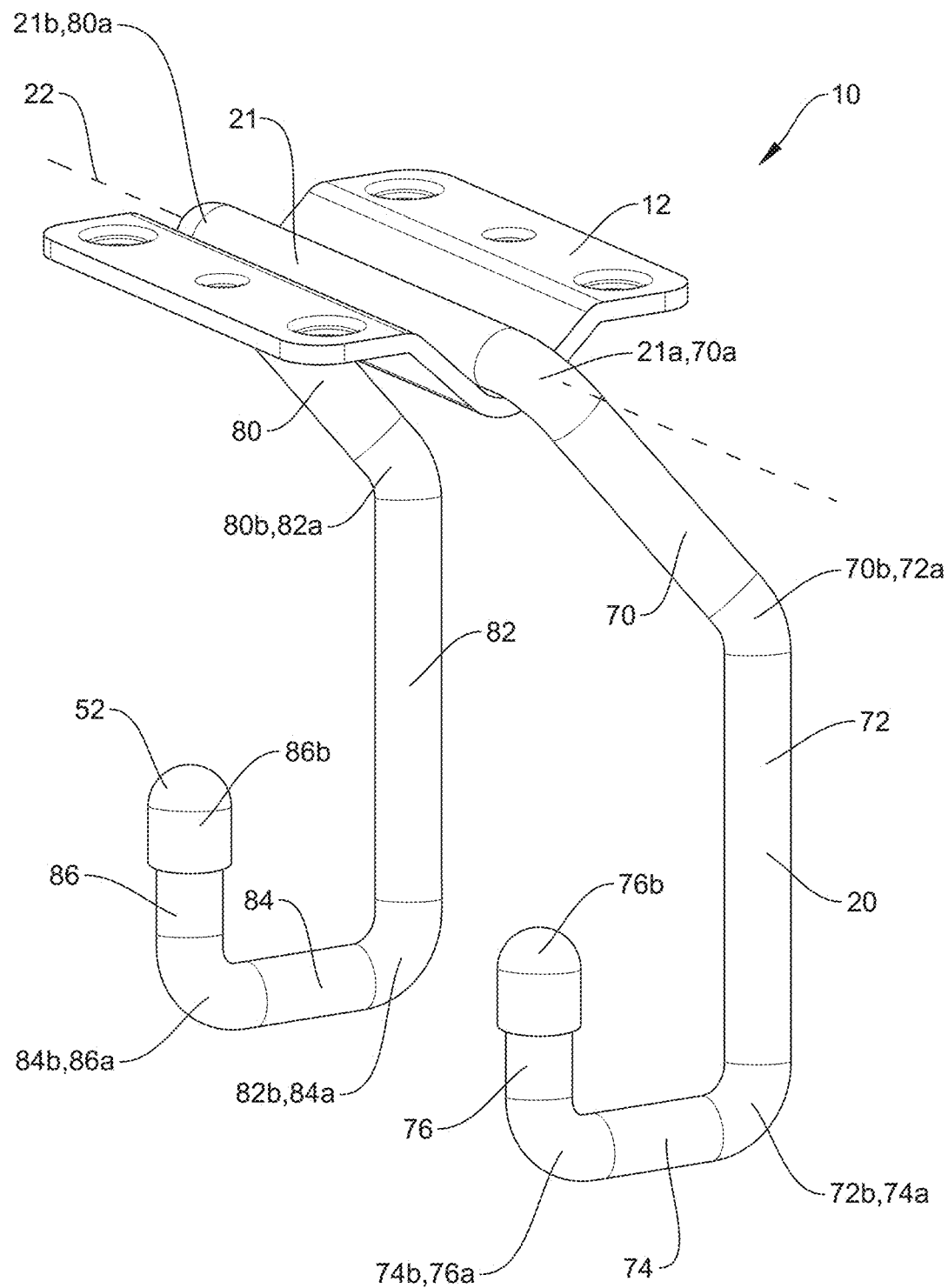
FIG. 33 is an isometric view of another embodiment of a ceiling mounted device of the present invention.
Figure 34:
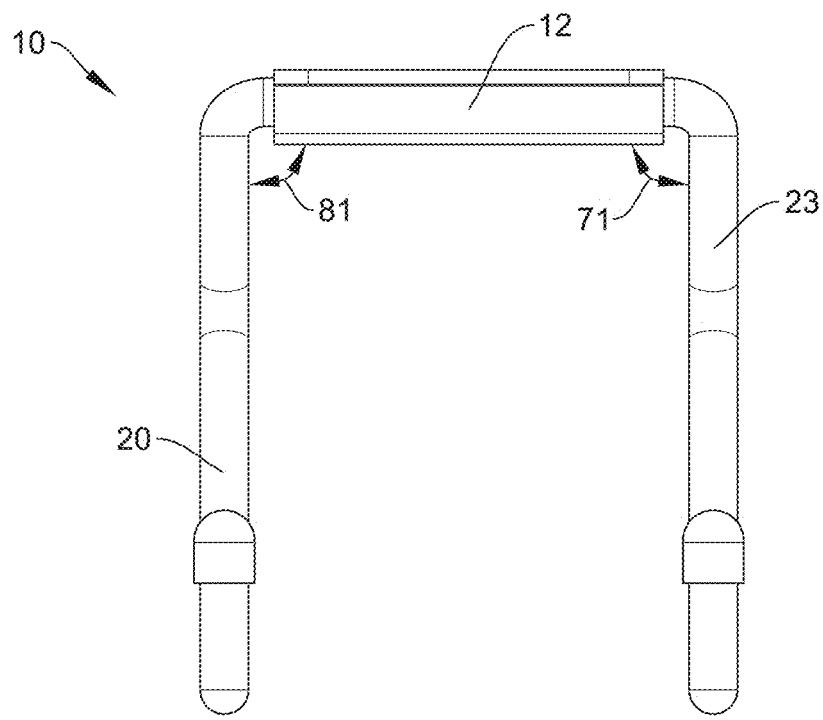
FIG. 34 is a front view of the structure of FIG. 33.
Figure 35:
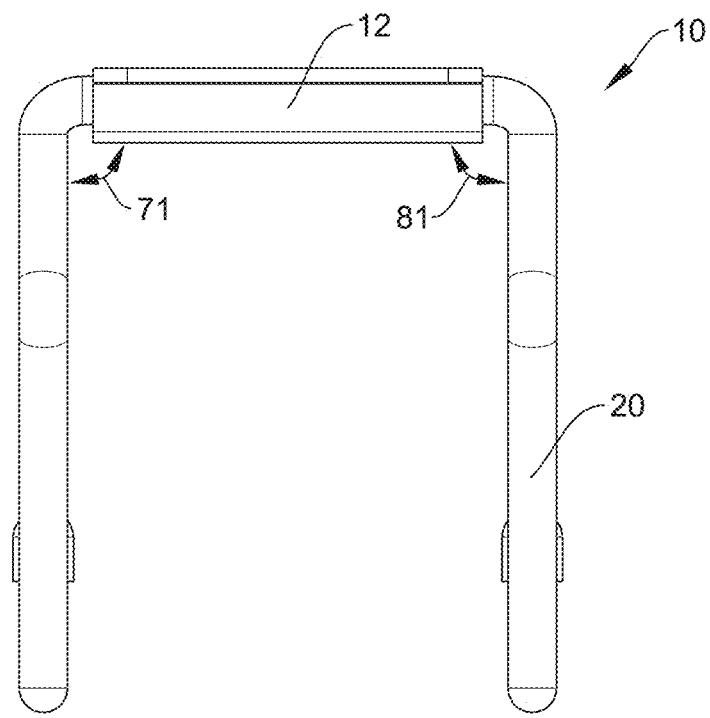
FIG. 35 is a rear view of the structure of FIG. 33.

As shown in FIGS. 1-11 a first embodiment of a ceiling mounted device 10 is depicted. The ceiling mounted device 10 is configured for removably storing a plastic storage bin 11 (i.e., totes, boxes, containers) as best shown in FIG. 30. FIGS. 12-20 show another embodiment of the ceiling mounted device 10 that is more refined, in that the shapes have been optimized for plastic injection molding to remove material while retaining structural strength. FIGS. 21-28 show a fastener marking tool 34 that is used to help install the ceiling mounted device. FIG. 29 shows the fastener marking tool in action, and as previously referenced, FIG. 30 shows how the ceiling mounted device is mounted to an underside 17 of a ceiling 18 and how it captures the rim 28 of a plastic storage bin 11 thereby enabling storage of the bin in a location that is out of the way thus becoming a beneficial storage solution. FIG. 31 shows how the hook is naturally biased towards the plastic storage/container bin due to its center of gravity. FIG. 32 shows another embodiment of the present invention as a single injection molded part utilizing a living hinge.

Referring now to FIGS. 1-20, a bracket 12 defines a first end 13 opposite a second end 14 having a channel 15 disposed therebetween. The first end and the second end mutually define a top plane 16 configured to abut against an underside 17 of a ceiling 18 as shown in FIG. 30. As shown, the channel is disposed below the top plane. The channel in this embodiment has a V-shape, as this shape is optimal for nesting a multitude of brackets together for shipping if necessary. However, it will be understood by those skilled in the art that many other shapes of channels could have been used such as a circular, an oval, a triangular shape and many others. The channel is open towards the top plane, as this becomes helpful when assembling the channel into the hook 20. Being open means there is no material blocking access to inside the channel from the top plane. Also, the channel defines a pivot axis 19 for the axle 21 of the hook 20.

A hook 20 comprises an axle 21 which defines a longitudinal axis 22. The axle is simply a cylindrical extension that enables it to freely pivot within the channel of the bracket. It is understood by those skilled in the art that many axle shapes could have been used as the cylindrical extension is just one type of axle shape that would create a pivotable connection. The axle extends between a first arm 23 disposed opposite to a second arm 24. The first arm connects to the second arm at a spine 25. The first arm, the second arm, the spine and the axle delimit (i.e., define the boundaries of) an aperture 26.

To place the bracket within the aperture, at least the first end and/or the second end of the bracket is configured to pass through the aperture of the hook. (In the embodiments shown herein, both the first and second ends can pass through the aperture 26 but it is understood that only one end may be needed to pass through the aperture as the other end may be configured wider if needed.) This enables the axle of the hook being configured to be disposed within the channel aligning the pivot axis 19 and the longitudinal axis 22. It is understood with this teaching that the inside curvature of radius of the channel is equal to or slightly larger in comparison to the outside curvature of radius of the axle, such that the axle does not bind up within the channel when in use. In other words, the axle of the hook is to pivot freely within when it is captured in the channel of the bracket. Accordingly, the hook is (freely) pivotably attached to the bracket when the axle is disposed within the channel when the bracket is mounted to the underside of the ceiling as shown in FIG. 30.

At least one prong 27 extends from and is connected to the spine and/or the first and second arms. The at least one prong extends upwards when the hook is pivotably hanging from the bracket when the bracket is attached to the underside of the ceiling. The at least one prong is configured to removably capture a rim 28 of the plastic storage bin as best shown in FIG. 30, so it needs to point upwards or back towards the bracket that is capturing it. Said differently, the at least one prong 27 extends generally towards the axle 21.

In all the embodiments shown herein, the at least one prong comprises at least two prongs 27*a* and 27*b* spaced a distance 51 apart from one another. This was done to improve the stability of the hook when holding a plastic storage/container bin. Furthermore, this was done to allow the hook part to be injection molded in a simple two-part mold that required no pulls. This was accomplished by placing the two prongs outside the spine so that plastic injection molding could be simplified. It will be understood by those skilled in the art that one, two, three or any "n" number of prongs could have been used.

Figure 1:
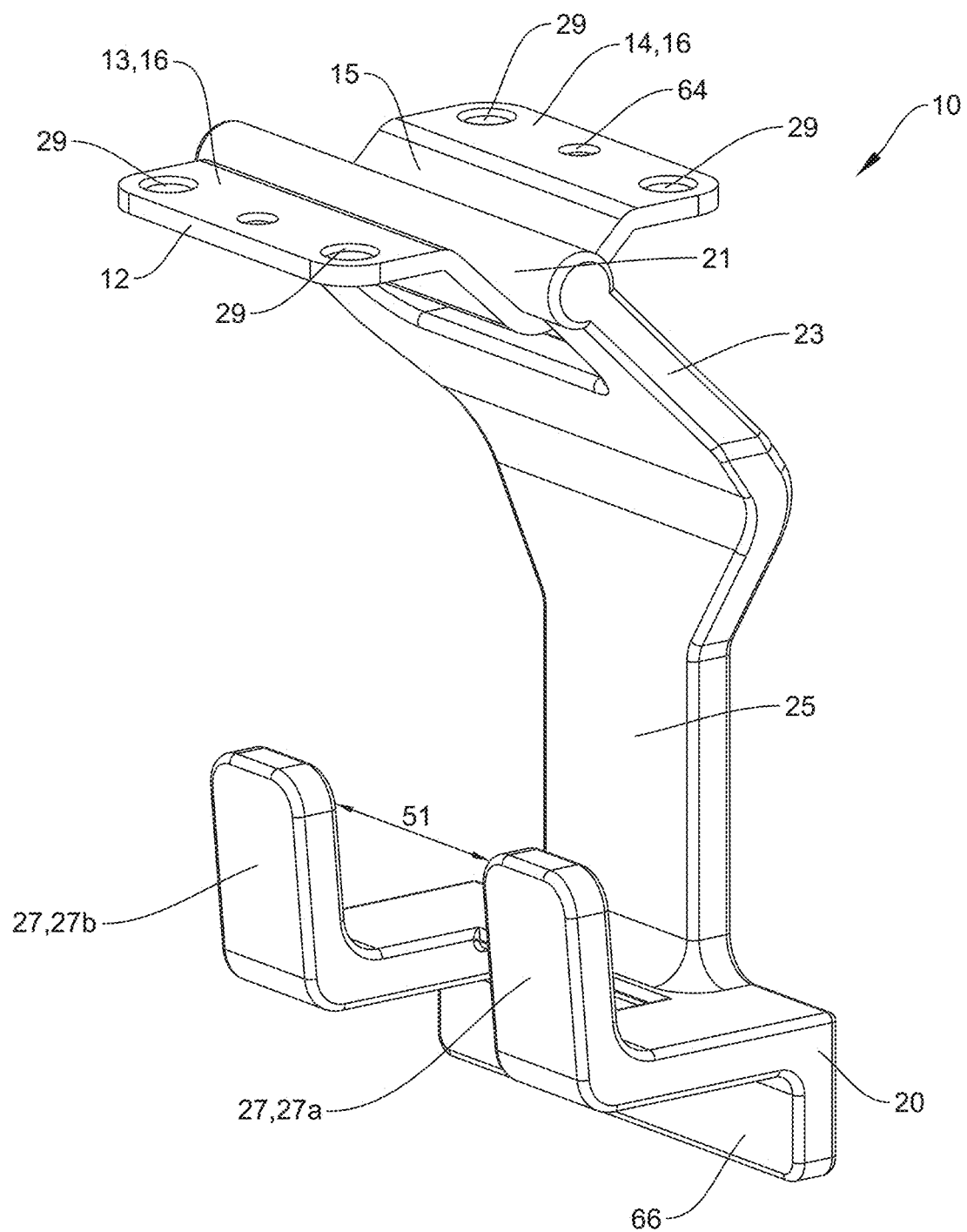
FIG. 1 is an isometric view of one embodiment of a ceiling mounted device of the present invention.
Figure 2:
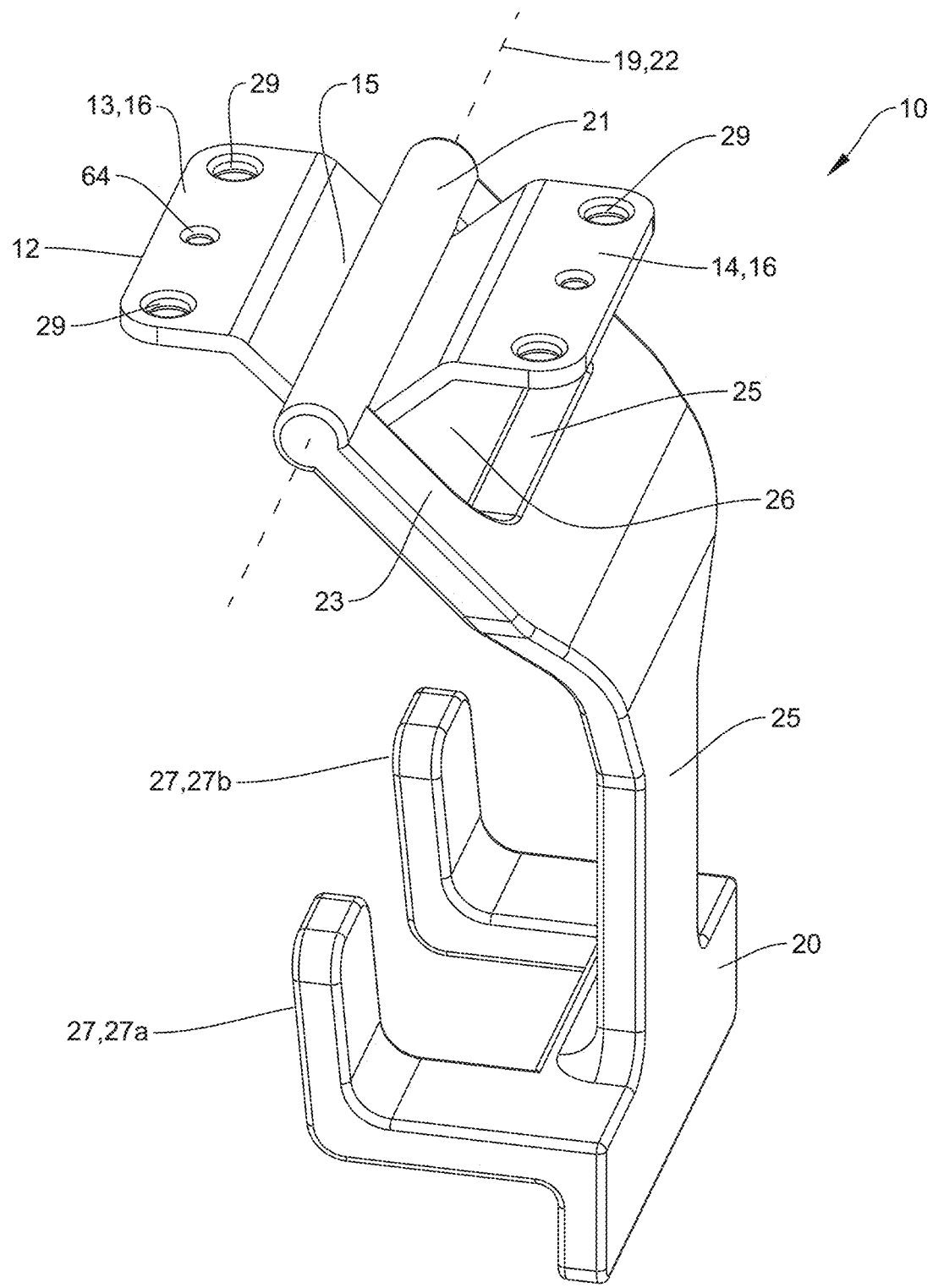
FIG. 2 is another isometric view of the structure of FIG. 1.
Figure 3:
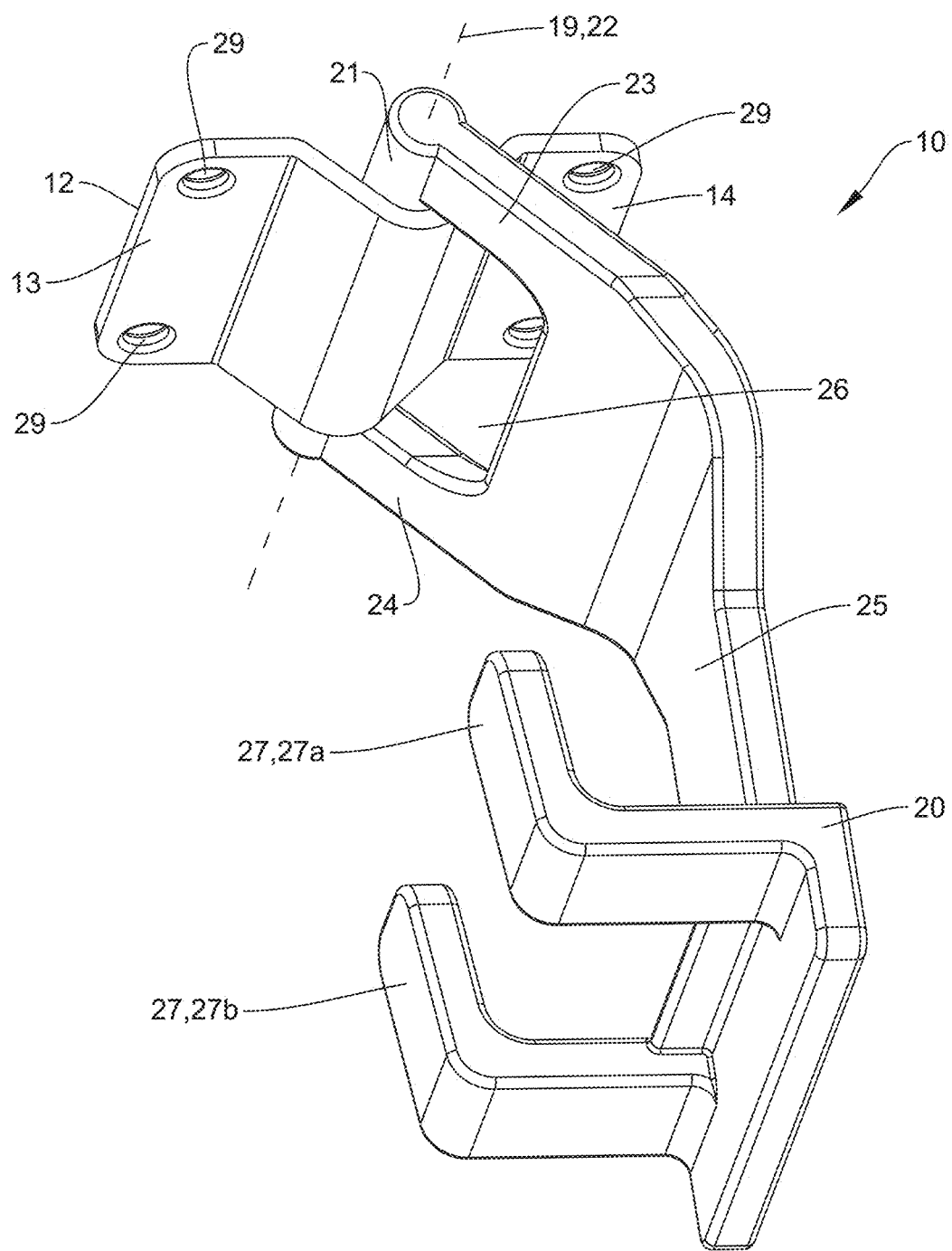
FIG. 3 is another isometric view of the structure of FIG. 1.
Figure 4:
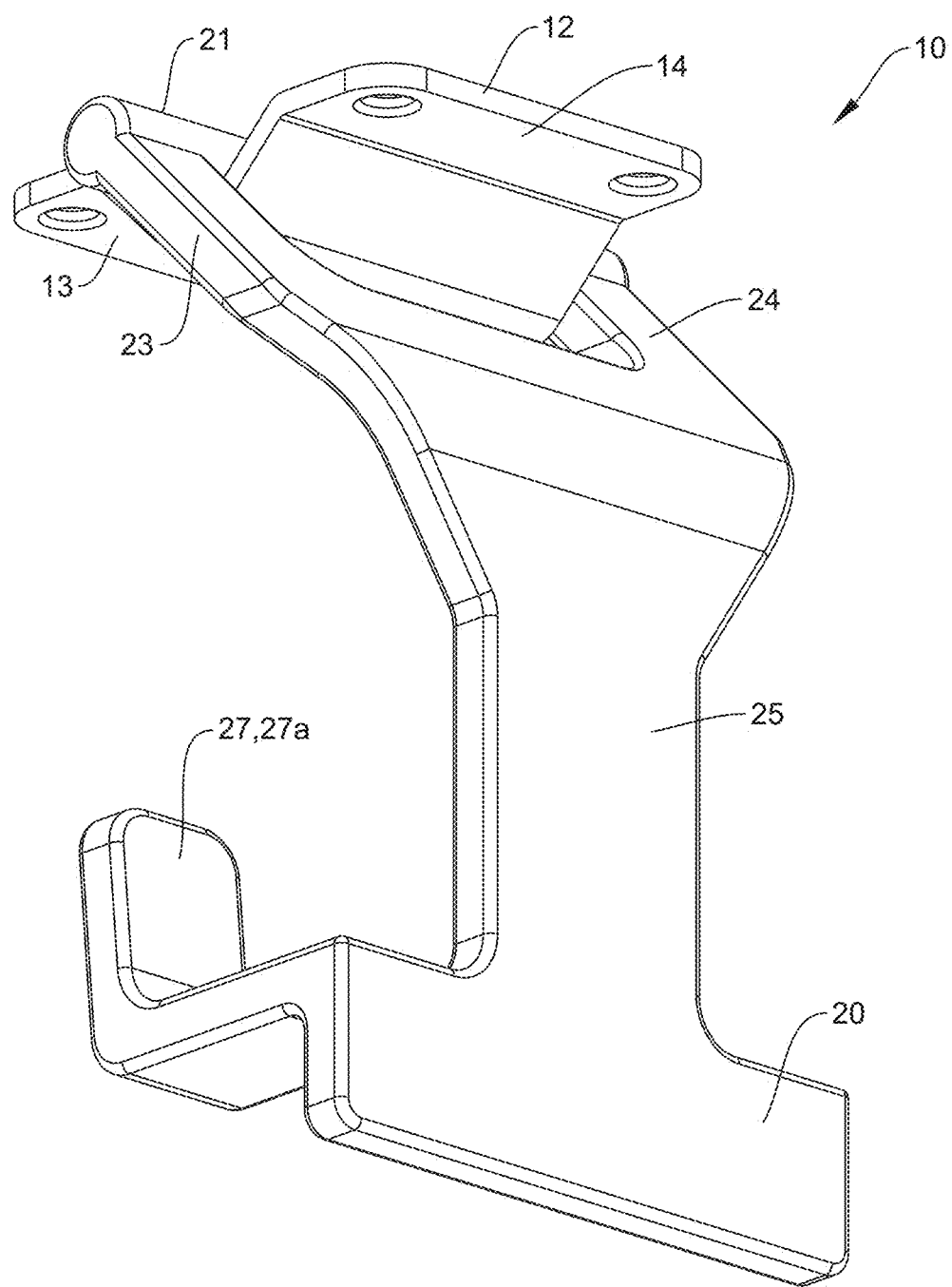
FIG. 4 is another isometric view of the structure of FIG. 1.
Figures 5, 6:
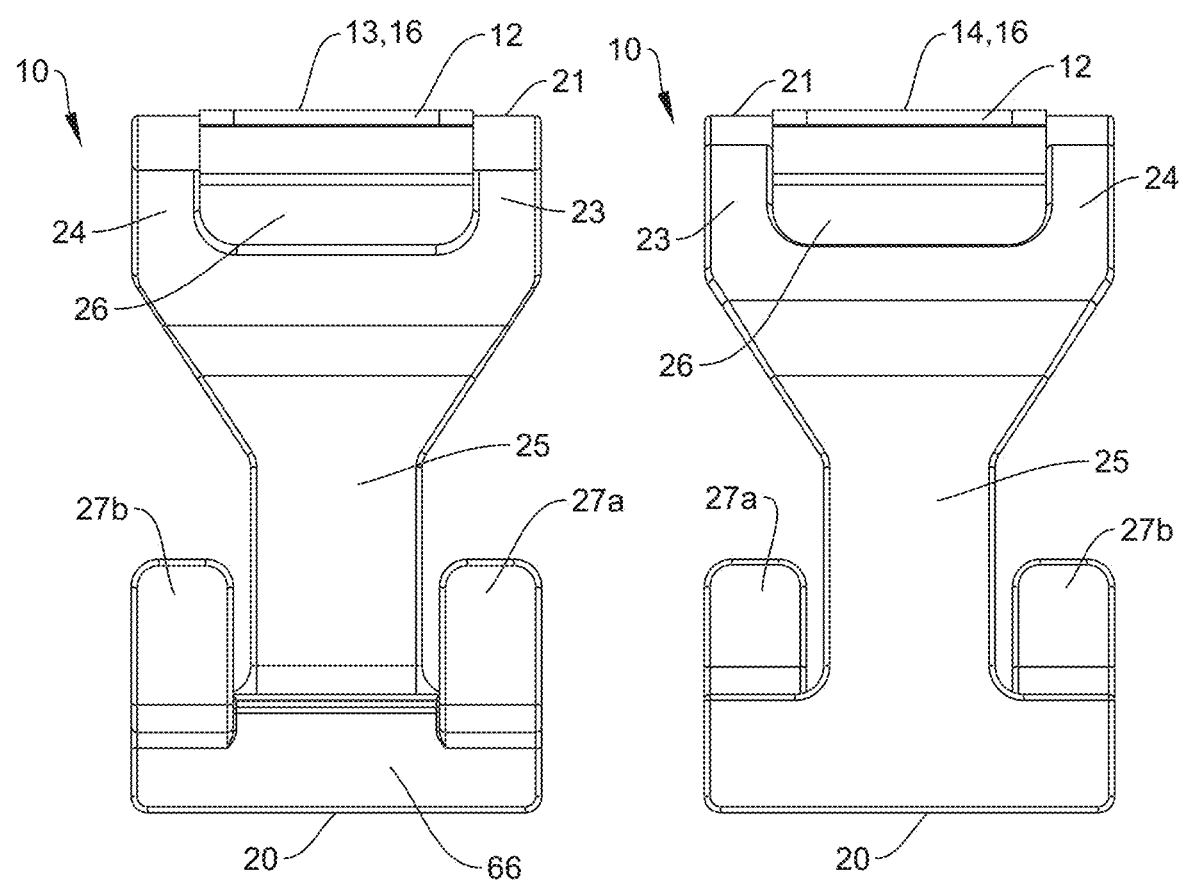
FIG. 5 is a front view of the structure of FIG. 1.
FIG. 6 is a rear view of the structure of FIG. 1.
Figures 7, 8:
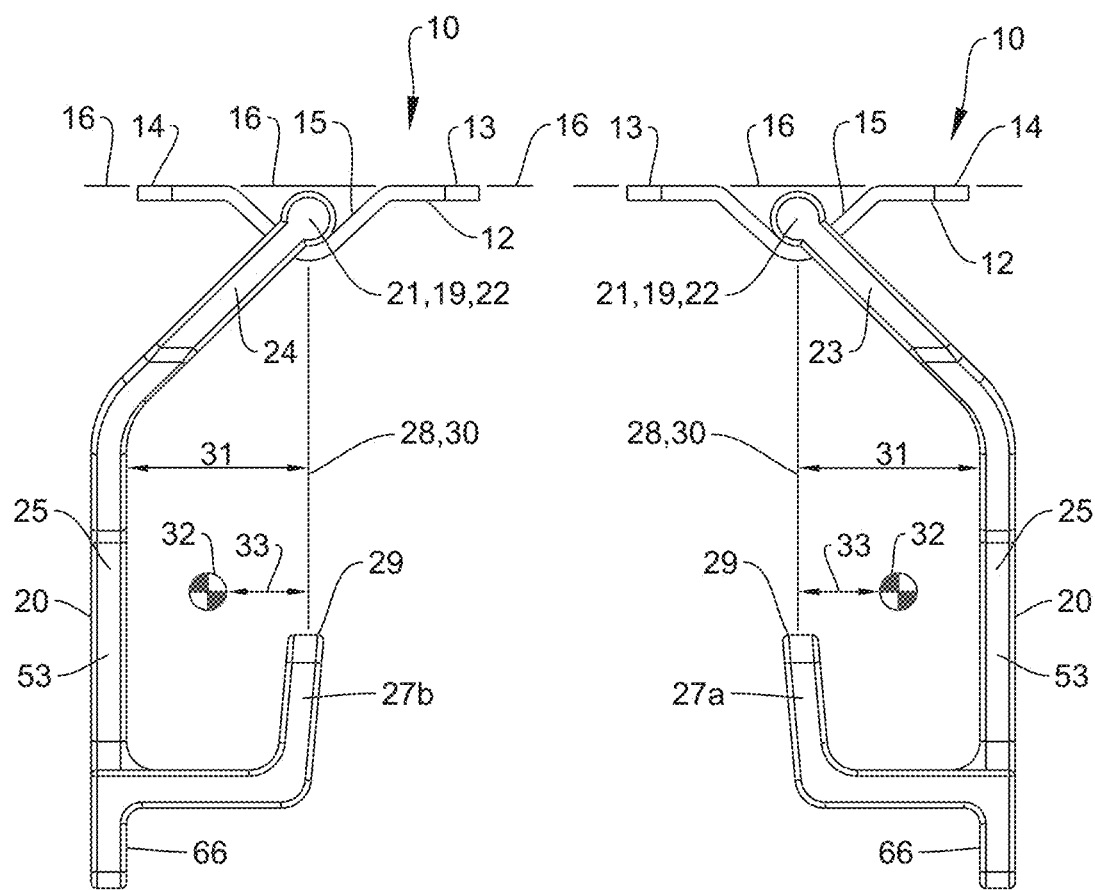
FIG. 7 is a left-side view of the structure of FIG. 1.
FIG. 8 is a right-side view of the structure of FIG. 1.
Figure 9:
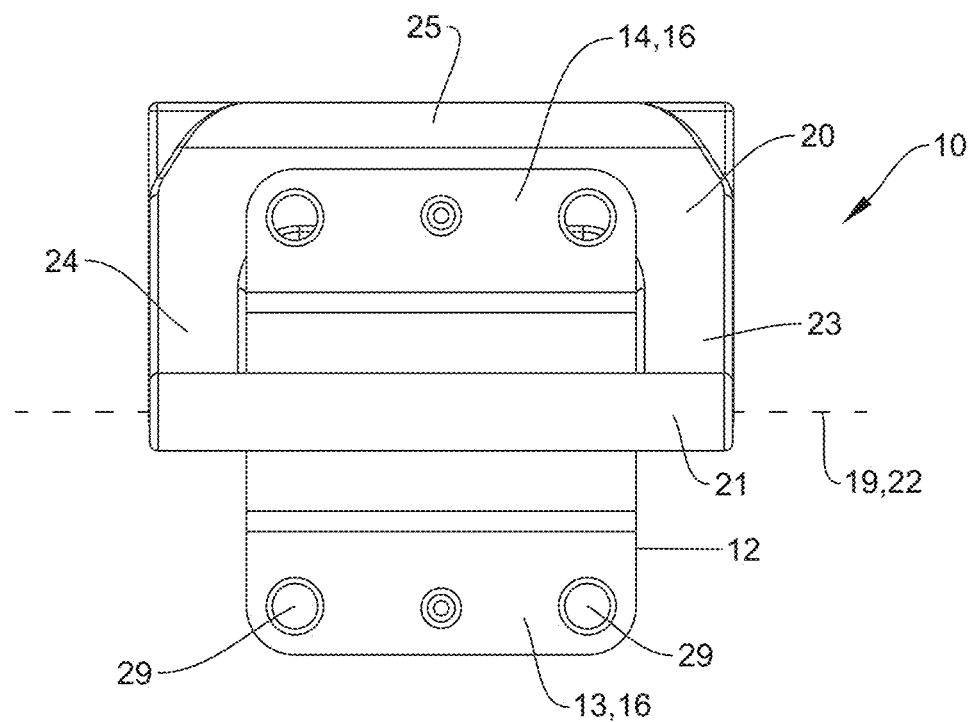
FIG. 9 is a top view of the structure of FIG. 1.
Figure 10:
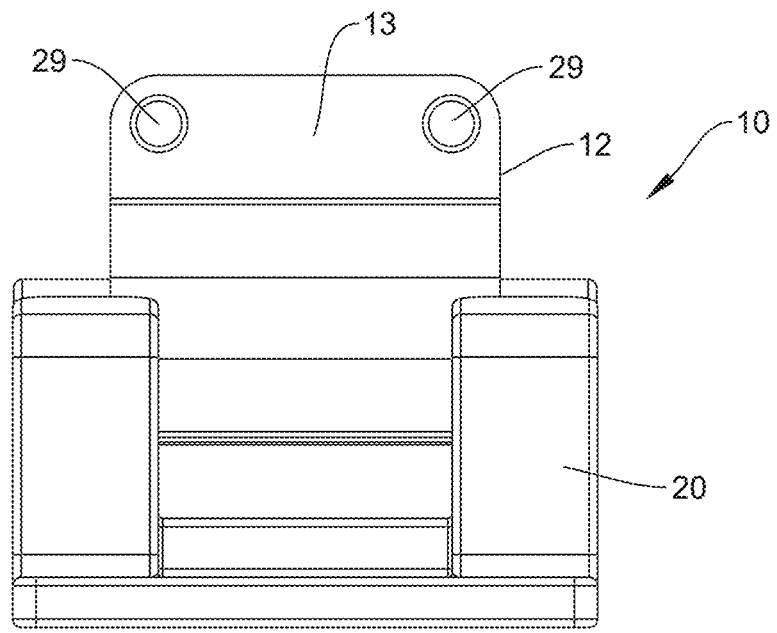
FIG. 10 is a bottom view of the structure of FIG. 1.
Figure 11:
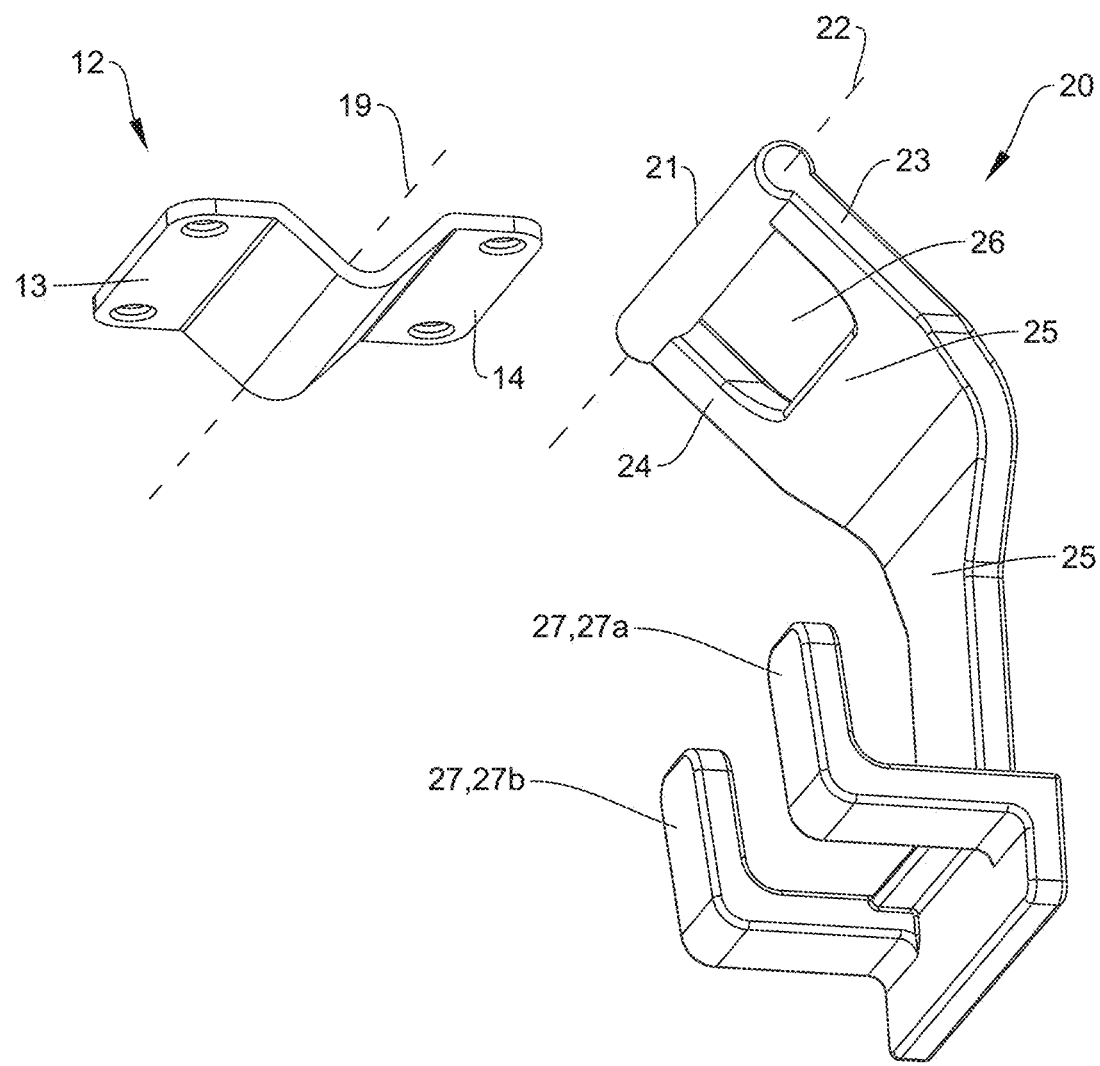
FIG. 11 is another isometric view of the structure of FIG. 1 now in an exploded state.
Figure 12:
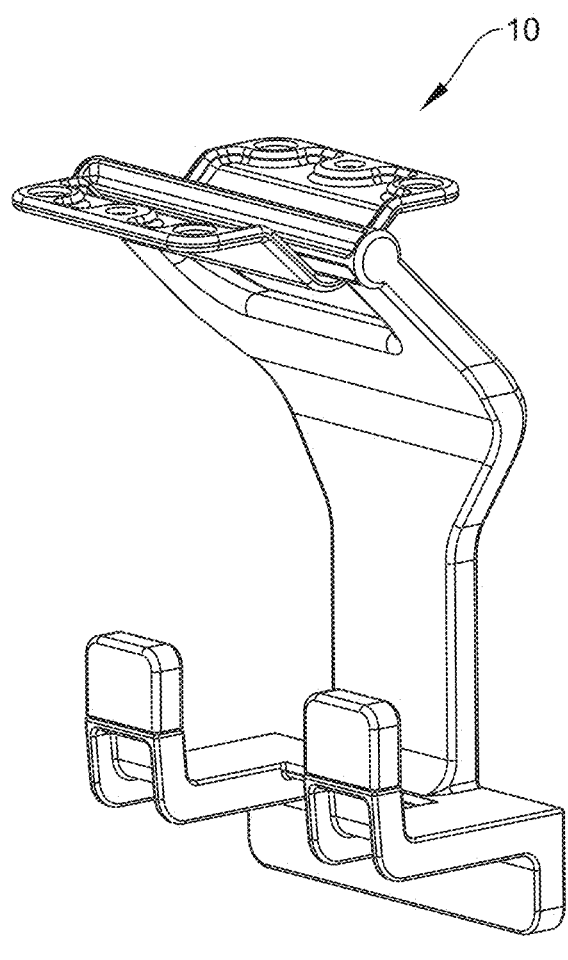
FIG. 12 is an isometric view of another embodiment of a ceiling mounted device of the present invention.
Figure 13:
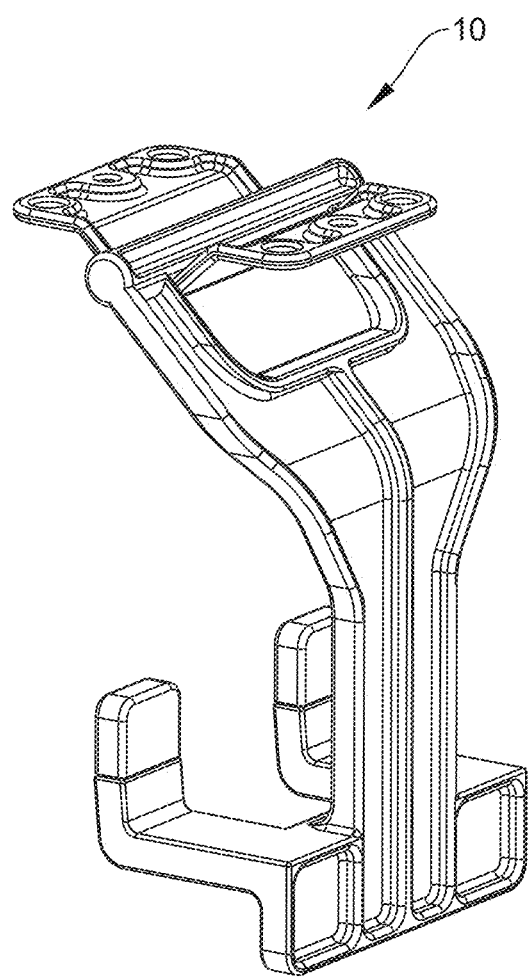
FIG. 13 is another isometric view of the structure of FIG. 12.
Figure 14:
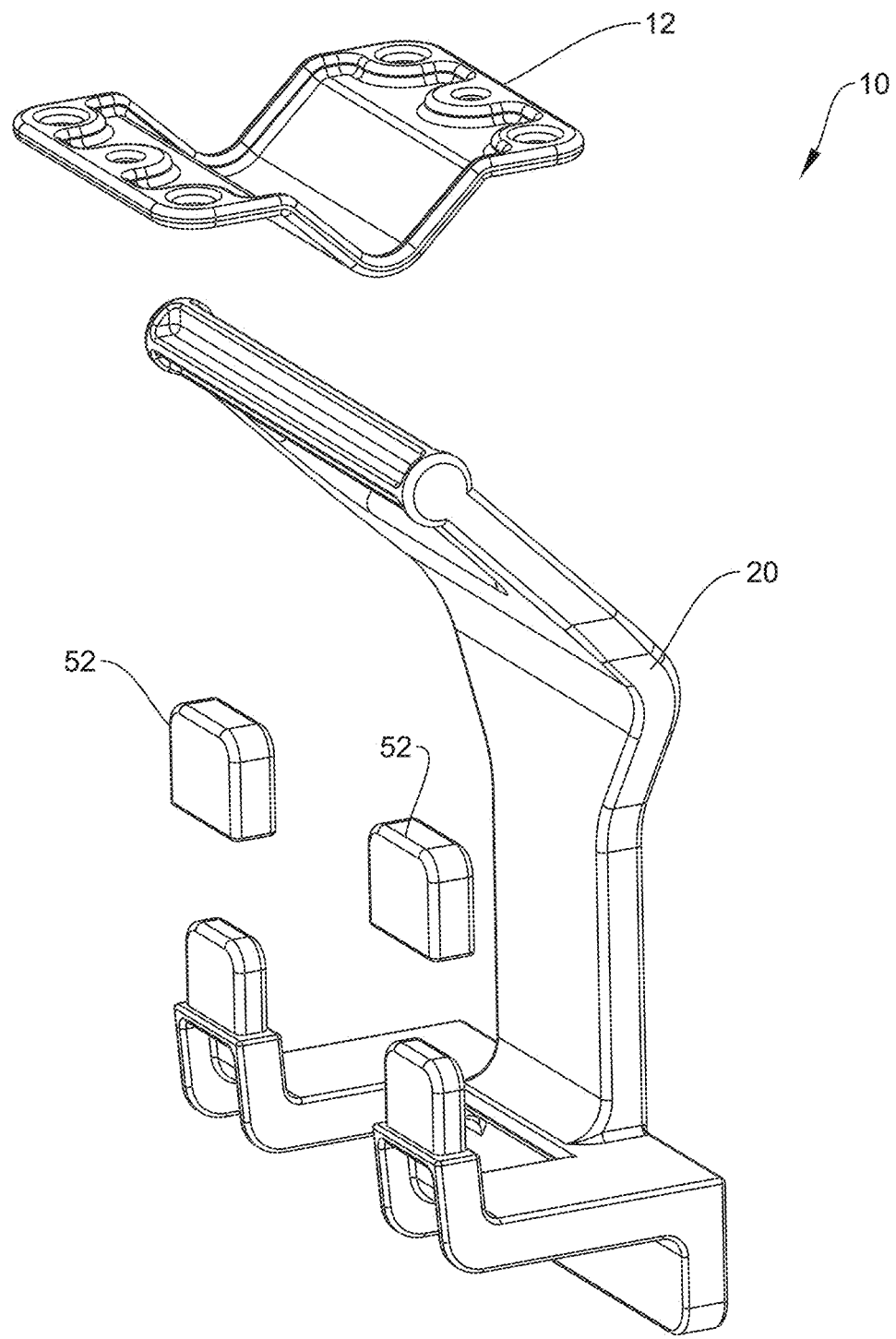
FIG. 14 is another isometric view of the structure of FIG. 12 now in an exploded state.
Figure 15:
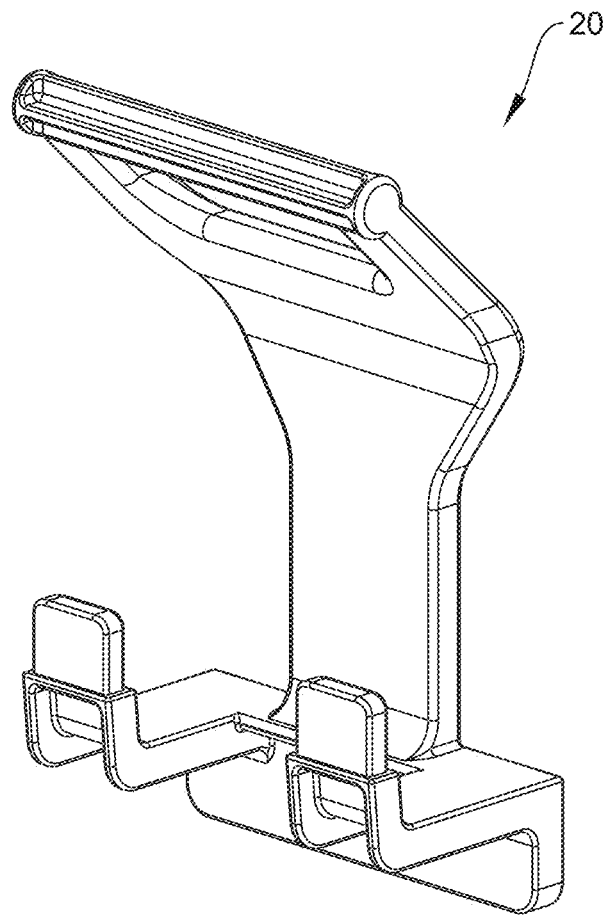
FIG. 15 is another isometric view of just the hook structure of FIG. 12.
Figure 16:
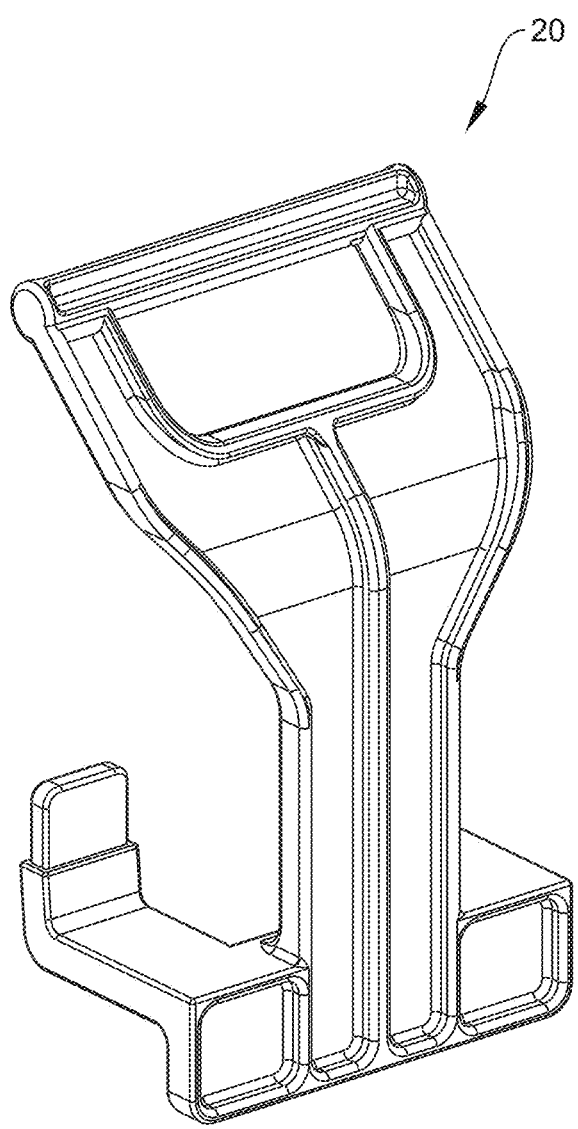
FIG. 16 is another isometric view of just the hook structure of FIG. 12.

As best shown in FIGS. 7 and 8, a center 28 of a top surface 29 of the at least one prong 27 is vertically aligned with the longitudinal axis of the axle defining a vertical plane 30. This structural shape of the hook aligns the load path through the hook when the top surface 29 of the at least one prong is loaded with the weight of the plastic storage/container bin. As one can see, the load path passes through the axle 21 and the top surface 29. This means at least a portion 53 of the spine is disposed a first distance 31 from the vertical plane 30. Furthermore, a center of gravity 32 of the hook is disposed a second distance 33 from the vertical plane. Thus, the second distance 33 is less than the first distance 31.

The unique structural configuration of the hook is important when looking at FIG. 31 where the plastic container bin is not engaged with the prongs of the hook. As can be seen, the hook is free to pivot within the channel of the bracket, so it naturally wants to move towards to the plastic container bin. This results in a structure that is biased towards closing onto the plastic container bins. This helps when one is trying to engage the prongs of the hook. This also helps if one was to bump or inadvertently move the plastic container bin. Furthermore, this also helps with earthquakes as the hooks are always naturally biased into capturing the plastic container bins. Of course, a highly violent earthquake could knock a plastic container bin loose from the hook, but an event of such magnitude rarely occurs such that is not a significant concern which needs further addressing.

The bracket and the hook could be made of a whole range of materials, including but not limited to, plastics, metals, composites, fiberglass, carbon fiber and the like. However, for a mass production process, the likely material of choice is plastic, i.e., polymers such as ABS or polycarbonate to name a couple. Thus, it is understood by those skilled in the art that the shapes shown and taught herein for the bracket and the hook are integrally formed as one part for the injection molding process. In other words, the first end, the channel and the second end are integrally formed as one part comprising the bracket and wherein the axle, the first arm, the second arm, the spine and the at least one prong are integrally formed as another single part comprising the hook. Thus, the bracket and hook may be both be injection molded plastic parts.

It is understood that the bracket and the hook are separate parts configured to cooperatively work together to form the ceiling mounted device. However, the separate parts could have been made as one part through the use of a living hinge 54. For example, when referring to FIG. 32 the bracket 12 and the hook 20 could be molded as one part where the bracket is connected to the hook through the living hinge 54, which is a thin piece of plastic large/strong enough to create a hinge but thin enough such that the hinge can bend upon itself without breaking. The bracket no longer needs the channel such that the bracket can be flat and the hook no longer needs the aperture. The inventor of this application felt that the overall ceiling mounted device worked better for use when the bracket and hook were separate parts, as the living hinge would not allow the hook to freely rotate due to the inherent rigidity of the living hinge feature itself. However, the embodiment of FIG. 32 would work such that it could be a viable product in the marketplace.

It is understood from reading this disclosure that to actually capture a plastic container bin, at least two ceiling mounted devices are needed to capture both (opposite) ends of the plastic container bin. Thus, the bracket comprises a first and a second bracket and the hook comprises a first hook and a second hook, wherein the first hook is pivotably attached to the first bracket and the second hook is pivotably attached to the second hook, wherein the first and second hooks and brackets are configured to cooperatively work for removably storing the plastic storage bin to the underside of the ceiling. For larger plastic container bins, it is recommended that two ceiling mounted devices spaced apart are used on each side, such that the plastic container bin is captured with four devices in total.

The first end and the second end of the bracket each have at least one hole or slot 29 disposed therethrough configured to receive a fastener 30. As shown in these embodiments, there are four holes 29 through each bracket. It is understood that any number of holes or slots could be used from one, two, three, four or any "n" number of fastener receiving/engaging features.

While an installer of the present invention could screw the ceiling mounted device into the wooden studs of the ceiling, the present invention is configured to attach directly into the drywall of the ceiling. In this manner, it allows an increased area for placement as an installer no longer needs to use a stud finder and no longer needs to attach directly into studs. Furthermore, the installer can install the present invention by himself or herself with no special training or outside (secondary) assistance.

The first step in the installation process is to first mark the locations for the drywall fasteners such that they can be predrilled with a power drill and drill bit. Then, using a hand screwdriver and not a power drill so not to destroy the drywall, hand screw the fasteners into the drywall until it is snug. Again, it is recommended to tighten until it is snug and then stop, as overtightening will pull the drywall apart and destroy its holding capacity. Use of a power drill to screw in the drywall fasteners is highly discouraged, as the power generated is too much and will destroy the drywall in the process.

The hardest part of the installation process is simply marking onto the ceiling the exact locations for predrilling. For example, if one was to install a large plastic container bin using four devices, this means that 16 holes need to be marked and their location must be accurate with respect to one another such that the present invention functions as designed. Marking 16 holes accurately is the toughest part of the installation process. Thus, the inventor has also created a tool to dramatically simplify this most difficult step of marking the holes onto the ceiling.

Figure 21:
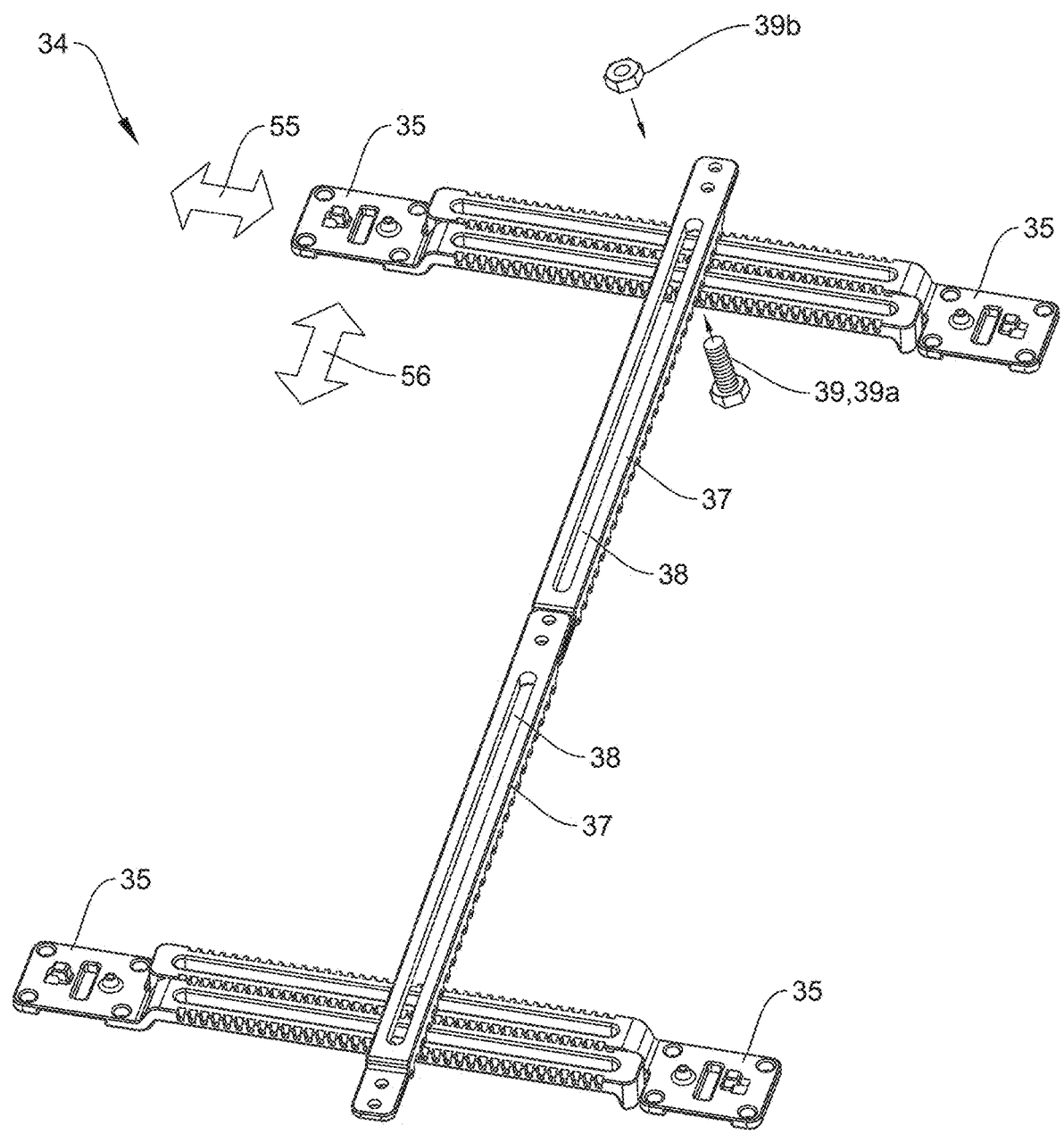
FIG. 21 is an isometric view of a fastener marking tool of the present invention.
Figure 22:
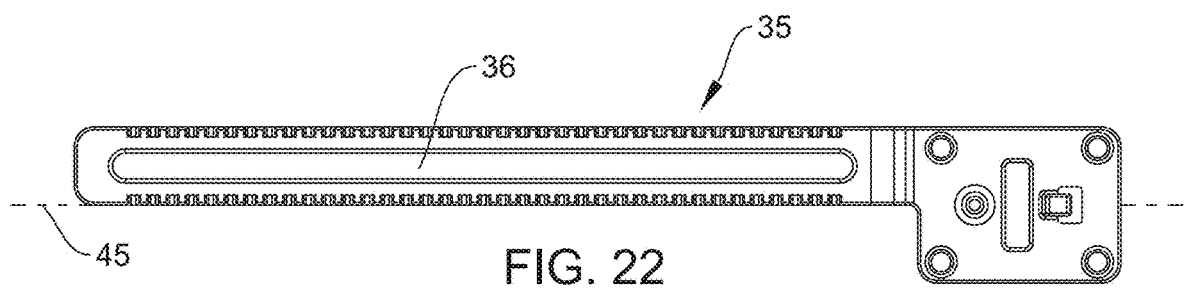
FIG. 22 is a top view of just a template tool of the structure of the FIG. 21.

Referring now to FIGS. 21-29, a fastener marking tool 34 is associated with the ceiling mounted device. The fastener marking tool comprises at least one template tool 35 having a first elongated slotted extension 36 and at least one transverse tool 37 being a second elongated slotted extension 38. As shown in FIG. 21, the at least one template 35 tool is configured to be mounted perpendicularly to the at least one transverse tool 37 configured for a fastener 39 being disposed through the first and second elongated extensions. The fastener can be a screw 39a that then attaches to a nut 39b on the other side, but it will be understood by those skilled in the art that a variety of fasteners may be utilized.

Through the use of the two slotted extensions 36 and 38, the parts can translate with respect to one another. Therefore, the parts can move relative to another along arrow (direction of movement) 55 and along arrow (direction of movement) 56. This assembly 34 then allows the installer to match it to the dimensions of the plastic container bin they want to secure to the ceiling. The at least one template tool has a window aperture 46 disposed therethrough that corresponds to the pivot axis of the bracket when the at least one hole or slot of the at least one template tool matches to the at least one hole or slot of the bracket. In other words, the window aperture 46 can be used very easily to match the sizing of the rim of the plastic container bin. For example, an installer would simply lay the tool 34 onto the rim of the plastic container bin to verify that the correct spacing has been achieved before using the tool against the ceiling to mark the holes.

Figure 24:
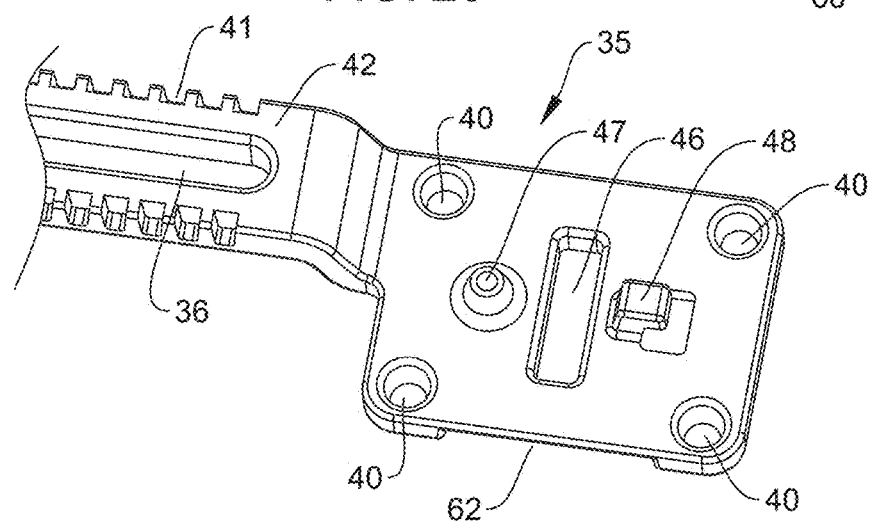
FIG. 24 is an enlarged isometric view of the structure of FIG. 22.
Figure 25:
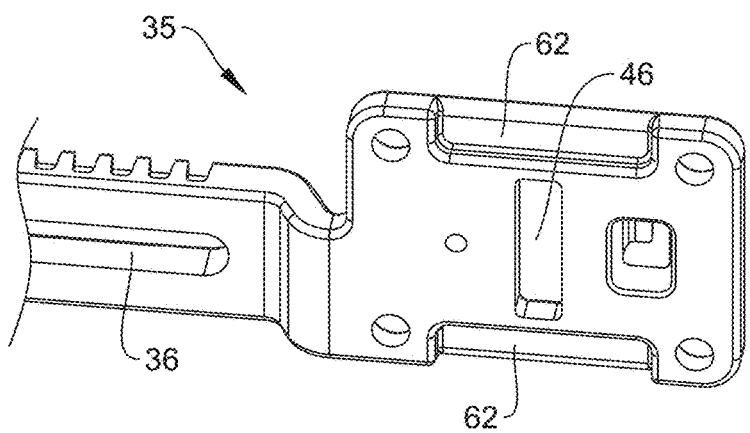
FIG. 25 is another enlarged isometric view of the structure of FIG. 22.
Figure 26:
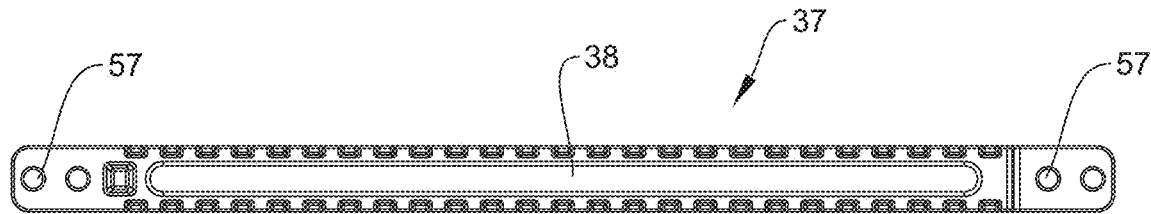
FIG. 26 is a top view of just a transverse tool of the structure of the FIG. 21.
Figure 27:
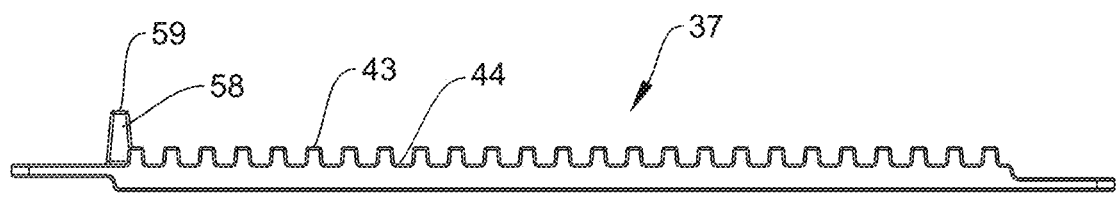
FIG. 27 is a side view of the structure of FIG. 26.
Figure 28:
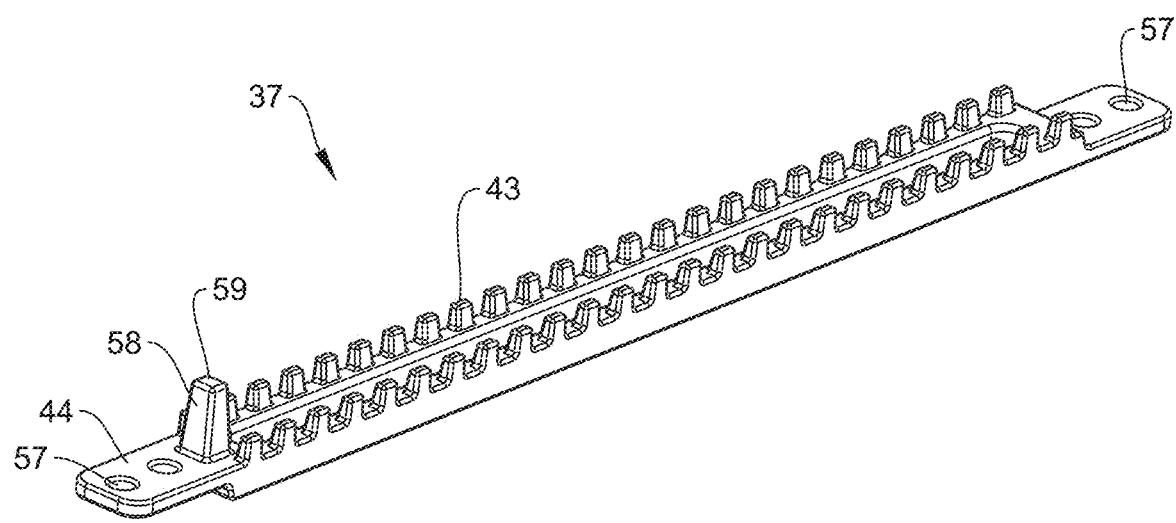
FIG. 28 is an isometric view of the structure of FIG. 26.

When looking at FIGS. 24 and 25, the at least one template tool has at least one hole or slot 40 that matches a spacing of the at least one hole or slot 29 of the bracket. These holes 40 are then used for an installer to mark the ceiling with a pencil or marker thus indicating the correct location to predrill the drywall screws.

To keep the tools aligned perpendicular to one another and to ease the use of the tooling, the at least one template tool has a plurality of first locks 41 disposed on an upper surface 42 of the first elongated slotted extension. Here, the locks 41 are recesses but could take on other shapes. Then, oppositely formed, the at least one transverse tool has a plurality of second locks 43 disposed on an upper surface 44 of the second elongated slotted extension. Here, the locks 43 are teeth that are configured to fit within the recesses 41. The plurality of first locks and second locks are configured to engage with one another when brought into engagement preventing movement of the at least one template tool relative to the at least one transverse tool. This then locks movement in the directions 55 and 56 and keeps the parts perpendicular to one another. Again, a plurality of fasteners 39 are used to secure the fastener marking tool 34 into a single rigid assembly that can then be placed up against the ceiling for marking the hole locations. It will be understood by those skilled in the art that a variety of designs for the first and second locks could be utilized as this teaching is not to be limited to the precise form disclosed herein.

The at least one hole or slot of the at least one template tool defines a centerline 45 extending parallel to the first elongated slotted extension. In other words, the centerline 45 is centered through the plurality of holes 40. As can be best seen in FIG. 22, the first elongated slotted extension is disposed on one side of the centerline and does not reside on the other side of the centerline. This then allows a second template tool to be abutted against the first template tool while keeping their respective holes 40 aligned in an opposing fashion as seen in FIG. 21. Furthermore, in this manner, it means that one mold using two different cavities can be utilized to create the six template tools shown in FIG. 21. For extra stability a second pair of transverse tools can be used to secure the fastener marking tool 34.

Likewise, the transverse tool can be attached to a second transverse tool with the use of the fasteners 39 and by utilizing the holes 57 disposed on each end. Now, both the template tool and the transverse tool can be made with a single two-part mold utilizing a single cavity for each. As can be appreciated, an installer can use or not use the various tools to create the right sizing for their particular plastic container bin, whether that bin is very small or very large.

Figure 23:
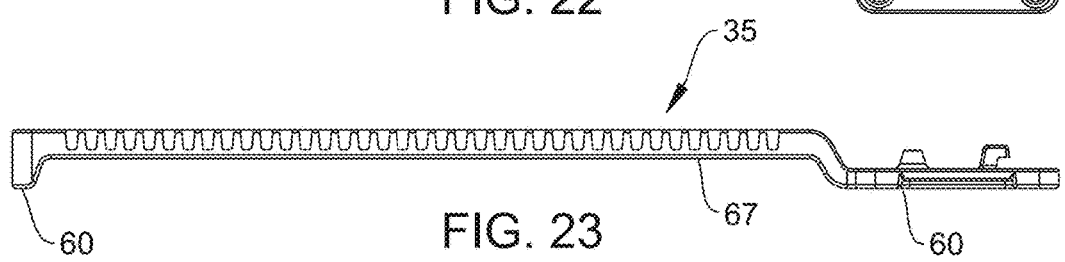
FIG. 23 is a side view of the structure of FIG. 22.

The transverse tool also has an extension 58 that stops at an upper surface 59. When the fastener marking tool 34 is assembled, the upper surface 59 is on a similar plane to a bottommost surface 60 of the template tool best seen in FIG. 23. This simply aids in the overall assembly 34 retaining its shape when pressed against the underside of the ceiling. Referring now to FIG. 23 it is noted that a second surface 67 is spaced apart from the bottommost surface 60. This is done to create a gap such that the head of the fastener 39 as shown in FIG. 21 may reside.

To make marking of the holes on the ceiling even easier, the at least one template tool includes a nail hole 47 configured to receive a nail 50 and includes a hook feature 48 configured to enable a rubber band 49 to engage it while also engaging a nail 50 disposed within the nail hole, as best shown in FIG. 29. Once a nail is placed into the nail hole 47, the rubber band holds it in place. The installer can then hold the entire fastener marking tool 34 up against the underside of the ceiling and simply tap in the nails 50 with a hammer. This then temporarily holds the entire fastener marking tool up against the ceiling such that the installer can then mark all 16 holes while not worrying about holding it up or having it slide out of position inadvertently. Once all the holes are marked, the entire tool 34 can be simply pulled from the ceiling, or the recesses 62 can be used with the back end of the hammer to pry it off the ceiling.

Referring back to the hooks 20, the hooks also have an optional downward extension which is a push pad 66. In normal use, the simple lifting and manipulation of the plastic container bin is enough to remove it from the ceiling mounted device 10. In the remote chance the hook is not pivoting freely, one can reach up and press against the push pad 66 to release the hook 20 from the plastic container bin. The push pad is also a good location for branding (i.e., HoverHooks) to be molded into each product.

Referring now to the brackets 12, if an installer wanted to install the brackets to a stud and wanted to center a fastener within the bracket, the bracket also has a predrill recess 64 formed therein on one side such that all the installer needs to do is to use a drill to drill out their own sized hole. The predrill recess is a blind hole and is not visible from the other side of the bracket. This is just a nice feature to have in case it is needed by the installer.

FIGS. 12-20 show a second embodiment of the present invention that is best suited for mass manufacturing. The plastic parts have been optimized for plastic injection molding to remove material while retaining structural strength. The overall shape of the bracket is generally the same as those shown in FIGS. 1-11.

Another difference is that now rubber tip structures 52 are placed upon the ends of the prongs 27. The rubber tip structures help grip the underside of the rim of the plastic container bins such that bin movement is prevented. The rubber tip structures 52 are optional but are an improvement to prevent slipping of the plastic container bins once the present invention has captured them. The rubber tip structures 52 simply have a blind recess 68 that is matched in size to the end of the prongs for a tight interference fit without the need for a secondary gluing/adhesive operation. Yet, for additional fitment, a secondary gluing/adhesive operation could be performed.

As can be appreciated by those skilled in the art, the present invention taught herein can be utilized in garages, basements, storage rooms, offices, closets and the like. Plastic container bins can be easily secured and removed by simply lifting and rotating slightly the plastic container bins such that the hooks engage and disengage.

While the present invention has been optimized for securing plastic container bins, it is understood that it could be used to store other items such as bags, clubs, backpacks and the like.

FIGS. 33-39 illustrate another embodiment of the present invention. In these embodiments, the hook 20 comprises an axle 21 defining a longitudinal axis 22, the axle extending between a first axle end 21a to a second axle end 21b. A first arm 70 defines a first upper arm end 70a opposite a first lower arm end 70b, where the first upper arm end is connected to or transitioning from the first axle end at a first axle-to-arm angle 71. A first leg 72 defines a first upper leg end 72a opposite a first lower leg end 72b. The first upper leg end is connected to or transitioning from the first lower arm end at a first arm-to-leg angle 73. A first foot 74 defines a first heel end 74a opposite a first toe end 74b. The first heel end is connected to or transitioning from the first lower leg end at a first leg-to-foot angle 75. A first prong 76 defines a first proximal end 76a opposite a first distal end 76b. The first proximal end is connected to or transitioning from the first toe end at a first foot-to-prong angle 77.

This particular hook can be injection molded, but in its current form it may be best to make from a metal rod and then bend it into shape during manufacture. Each of these angles described herein can be made by a machine configured to bend strong metal rods as is known in the industry. The metal rod may be solid or hollow.

The distal end 76b can include a rubber or rubber elastic coating or rubber tip structure 52 as previously described. The rubber portion 52 may be an interference fit for attachment. Alternatively, the rubber portion 52 may be disposed during an over-molding operation. Alternatively, the rubber portion 52 may be adhered to the distal end.

Similar to the first side, a second arm 80 defines a second upper arm end 80a opposite a second lower arm end 80b. The second upper arm end is connected to or transitioning from the second axle end at a second axle-to-arm angle 81. A second leg 82 defines a second upper leg end 82a opposite a second lower leg end 82b. The second upper leg end is connected to or transitioning from the second lower arm end at a second arm-to-leg angle 83. A second foot 84 defines a second heel end 84a opposite a second toe end 84b. The second heel end is connected to or transitioning from the second lower leg end at a second leg-to-foot angle 85. A second prong 86 defines a second proximal end 86a opposite a second distal end 86b. The second proximal end is connected to or transitioning from the second toe end at a second foot-to-prong angle 87.

Similar to the previously described embodiments, the first and the second prongs extend upwards when the hook is pivotably hanging from the bracket when the bracket is attached to the underside of the ceiling as the first and the second prongs are configured to removably capture a rim of the plastic storage bin.

Figure 36:
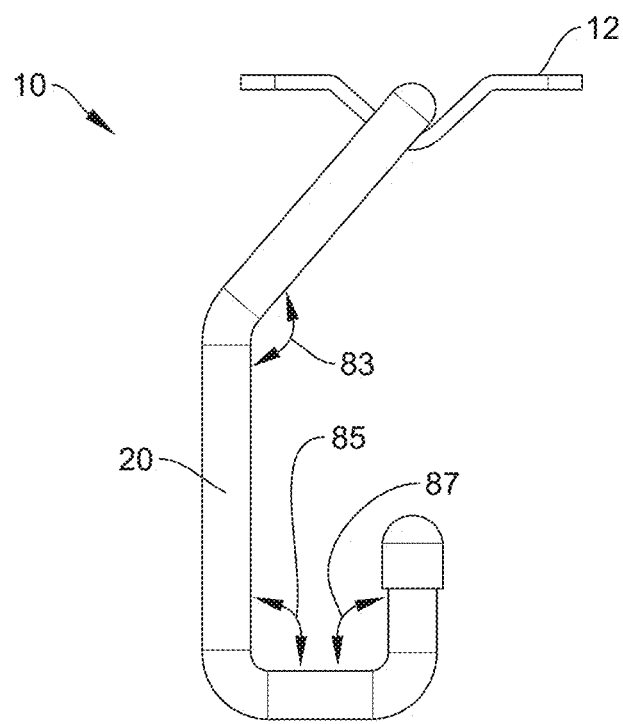
FIG. 36 is a left side view of the structure of FIG. 33.
Figure 37:
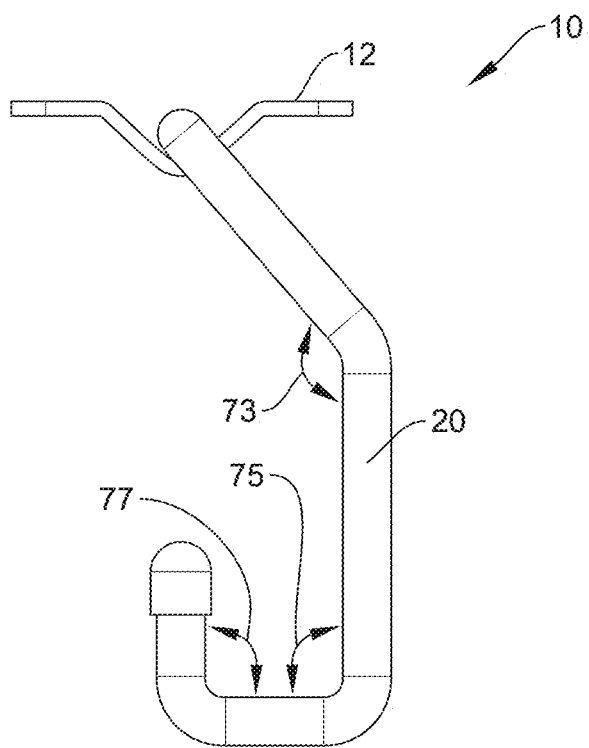
FIG. 37 is a right side view of the structure of FIG. 33.
Figure 38:
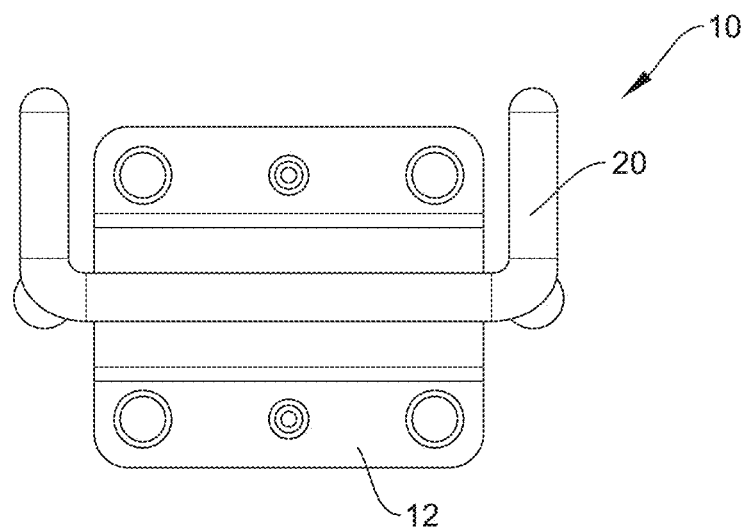
FIG. 38 is a top view of the structure of FIG. 33.
Figure 39:
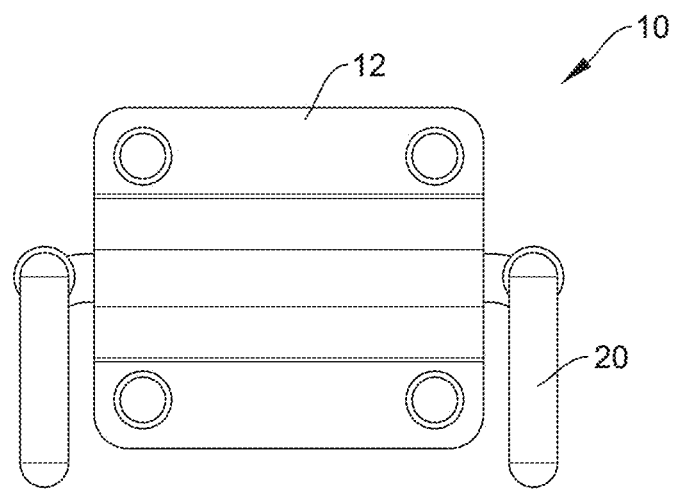
FIG. 39 is a bottom view of the structure of FIG. 33.

When best looking at FIGS. 36 and 37, the first and the second arm-to-leg angles are obtuse angles. More specifically, the first and the second leg-to-foot angles are greater than 90 degrees and less then 180 degrees. More specifically, the first and the second leg-to-foot angles are greater than 120 degrees and less then 150 degrees. As shown herein the arm-to-leg angles are actually 140 degrees.

The first and second axle-to-arm angles (71, 81) are generally at right angles, but could deviate slightly and not affect the invention's utility. Similarly, the first and second leg-to-foot angles are generally right angles, but could deviate slightly and not affect the invention's utility. Finally, the first and second foot-to-prong angles are right angles or slightly obtuse angles. Here, the foot-to-prong angles are shown as being around 90 degrees, but could also be 90-110 degrees. Again, the angles could deviate slightly and not affect the invention's utility, as long as the distal end of the prongs were able to reach inside the rim of the plastic bins captured by the hooks of the present invention.

In another embodiment not shown, it is understood by those skilled in the art that the shape of the hook may be simplified to have a J-shape, where the arm-leg-foot-prong sections flow into one another and are simplified by one 180-degree bend at the bottom of the hook. Thus, the hook takes on a J-shape that has one bend at the bottom. An axle could still connect two of the J-shaped structures, or just one J-shaped portion could be utilized if the axle was removed. The top of the J-shaped hook would still need to be pivotably attached to the ceiling by a bracket of some design. It is apparent from this teaching to those skilled in the art that a wide variety of hooks could be devised from the Applicant's teaching, as these embodiments are not meant to limit the extent of the Applicant's invention to the precise forms described herein.

Although several embodiments have been described in detail for purposes of illustration, various modifications may be made to each without departing from the scope and spirit of the invention. Accordingly, the invention is not to be limited, except as by the appended claims.

NUMERALS 10 ceiling mounted device
11 plastic storage bin
12 bracket
13 first end, bracket
14 second end, bracket
15 channel, bracket
16 top plane, bracket
17 underside, ceiling
18 ceiling
19 pivot axis
20 hook
21 axle
21a first axle end
21b second axle end
22 longitudinal axis
23 first arm
24 second arm
25 spine
26 aperture
27 at least one prong
27a first prong
27b second prong
28 rim
29 at least one hole or slot
30 fastener
31 first distance
32 center of gravity
33 second distance
34 fastener marking tool
35 at least one template tool
36 first elongated slotted extension
37 at least one transverse tool
38 second elongated slotted extension
39 fastener
40 at least one hole or slot, template tool
41 plurality of locks
42 upper surface
43 plurality of second locks
44 upper surface
45 centerline
46 window aperture
47 nail hole
48 hook feature
49 rubber band
50 nail
51 distance, between prongs
52 rubber tip structure
53 portion of the spine
54 living hinge
55 arrow, direction of movement
56 arrow, direction of movement
57 holes, transverse tool
58 extension, transverse tool
59 upper surface, extension, transverse tool
60 bottommost surface, template tool
62 recesses, template tool
64 predrill recess, bracket
66 push pad, hook
67 second surface, template tool
68 blind recess, rubber tip structure
70 first arm
70a first upper arm end
70b second upper arm end
71 first axle-to-arm angle
72 first leg
72a first upper leg end
72b first lower leg end
73 first arm-to-leg angle
74 first foot
74a first heel end
74b first toe end
75 first leg-to-foot angle
76 first prong
76a first proximal end
76b first distal end
77 first foot-to-prong angle
80 second arm
80a second upper arm end
80b second lower arm end
81 second axle-to-arm angle
82 second leg
82a second upper leg end
82b second lower leg end
83 second arm-to-leg angle
84 second foot
84a second heel end
84b second toe end
85 second leg-to-foot angle
86 second prong
86a second proximal end
86b second distal end
87 second foot-to-prong angle

What is claimed is:

1. A ceiling mounted device configured for removably storing a plastic storage bin, the ceiling mounted device comprising:
    a bracket comprising a first end opposite a second end having a channel disposed therebetween, wherein the first end and the second end mutually define a top plane configured to abut against an underside of a ceiling;
    wherein the channel is disposed below the top plane;
    wherein the channel is open towards the top plane;
    wherein the channel defines a pivot axis;

a hook comprising an axle defining a longitudinal axis, the axle extending between a first axle end to a second axle end;
a first arm defining a first upper arm end opposite a first lower arm end, wherein the first upper arm end is connected to or transitioning from the first axle end at a first axle-to-arm angle;
a first leg defining a first upper leg end opposite a first lower leg end, wherein the first upper leg end is connected to or transitioning from the first lower arm end at a first arm-to-leg angle;
a first foot defining a first heel end opposite a first toe end, wherein the first heel end is connected to or transitioning from the first lower leg end at a first leg-to-foot angle;
a first prong defining a first proximal end opposite a first distal end, wherein the first proximal end is connected to or transitioning from the first toe end at a first foot-to-prong angle;
a second arm defining a second upper arm end opposite a second lower arm end, wherein the second upper arm end is connected to or transitioning from the second axle end at a second axle-to-arm angle;
a second leg defining a second upper leg end opposite a second lower leg end, wherein the second upper leg end is connected to or transitioning from the second lower arm end at a second arm-to-leg angle;
a second foot defining a second heel end opposite a second toe end, wherein the second heel end is connected to or transitioning from the second lower leg end at a second leg-to-foot angle;
a second prong defining a second proximal end opposite a second distal end, wherein the second proximal end is connected to or transitioning from the second toe end at a second foot-to-prong angle;
wherein the axle is configured to pivotably attach to the bracket when the axle is disposed within the channel when the bracket is mounted to the underside of the ceiling;
wherein the first and the second prongs extends upwards when the hook is pivotably hanging from the bracket when the bracket is attached to the underside of the ceiling;
wherein the first and the second prongs are configured to removably capture a rim of the plastic storage bin; and
wherein the bracket comprises a first bracket and a second bracket and the hook comprises a first hook and an identically shaped second hook, wherein the first hook is pivotably attached to the first bracket and the second hook is pivotably attached to the second hook, wherein the first and second hooks and brackets are configured to cooperatively work for removably storing the plastic storage bin to the underside of the ceiling.

2. The ceiling mounted device of claim 1, wherein the first and the second arm-to-leg angles are obtuse angles.

3. The ceiling mounted device of claim 2, wherein the first and the second axle-to-arm angles are right angles.

4. The ceiling mounted device of claim 3, wherein the first and the second leg-to-foot angles are right angles.

5. The ceiling mounted device of claim 4, wherein the first and the second foot-to-prong angles are right angles or obtuse angles.

6. The ceiling mounted device of claim 1, wherein the first end, the channel and the second end are integrally formed as one part comprising the bracket, and wherein the axle, the first and second arms, the first and second legs, the first and second foots and the first and second prongs are integrally formed as one part comprising the hook, wherein the bracket and the hook are separate parts configured to cooperatively work together to form the ceiling mounted device.

7. The ceiling mounted device of claim 2, wherein the hook is a metal rod bent into shape.

8. The ceiling mounted device of claim 1, wherein the first end and the second end of the bracket each have at least one hole or slot disposed therethrough configured to receive a fastener.

9. The ceiling mounted device of claim 1, wherein the first and the second prongs extends towards the axle.

10. The ceiling mounted device of claim 1, wherein the distal end of the first and second prongs are vertically aligned with the longitudinal axis of the axle defining a vertical plane.

11. The ceiling mounted device of claim 10, wherein at least a portion of the first and the second legs are disposed a first distance from the vertical plane, wherein a center of gravity of the hook is disposed a second distance from the vertical plane, wherein the second distance is less than the first distance.

12. The ceiling mounted device of claim 1, including a fastener marking tool associated with the ceiling mounted device, the fastener marking tool comprising at least one template tool having a first elongated slotted extension and at least one transverse tool having a second elongated slotted extension, wherein the at least one template tool is configured to be mounted perpendicular to the at least one transverse tool with a fastener being disposed through the first and second elongated extensions.

13. The ceiling mounted device of claim 12, wherein the at least one template tool has at least one hole or slot that matches a spacing of the at least one hole or slot of the bracket.

14. The ceiling mounted device of claim 13, wherein the at least one template tool has a plurality of first locks disposed on an upper surface of the first elongated slotted extension, wherein the at least one transverse tool has a plurality of second locks disposed on an upper surface of the second elongated slotted extension, wherein the plurality of first locks and second locks are configured to engage with one another when brought into engagement preventing movement of the at least one template tool relative to the at least one transverse tool while keeping the at least one template tool perpendicular to the at least one transverse tool.

15. The ceiling mounted device of claim 14, wherein the at least one template tool defines a centerline extending parallel to the first elongated slotted extension, wherein the first elongated slotted extension is disposed on one side of the centerline and does not reside on the other side of the centerline.

16. The ceiling mounted device of claim 15, wherein the at least one template tool has a window aperture disposed therethrough that corresponds to the pivot axis of the bracket when the at least one hole or slot of the at least one template tool matches to the at least one hole or slot of the bracket.

17. The ceiling mounted device of claim 16, wherein the at least one template tool includes a nail hole configured to receive a nail, and wherein the at least one template tool includes a hook feature configured to enable a rubber band to engage it while also engaging the nail when disposed within the nail hole.

18. The ceiling mounted device of claim 1, wherein the first and the second arm-to-leg angles are greater than 120 degrees and less than 150 degrees.

19. A kit having a plurality of ceiling mounted devices configured for removably storing a plastic storage bin, the kit comprising:
- a plurality of brackets, each bracket comprising:
  - a first end opposite a second end having a channel disposed therebetween, wherein the first end and the second end mutually define a top plane configured to abut against an underside of a ceiling;
  - wherein the channel is disposed below the top plane;
  - wherein the channel is open towards the top plane;
  - wherein the channel defines a pivot axis;
- a plurality of hooks, each hook comprising:
  - an axle defining a longitudinal axis, the axle extending between a first axle end to a second axle end;
  - a first arm defining a first upper arm end opposite a first lower arm end,
  - wherein the first upper arm end is connected to or transitioning from the first axle end at a first axle-to-arm angle;
  - a first leg defining a first upper leg end opposite a first lower leg end,
  - wherein the first upper leg end is connected to or transitioning from the first lower arm end at a first arm-to-leg angle;
  - a first foot defining a first heel end opposite a first toe end, wherein the first heel end is connected to or transitioning from the first lower leg end at a first leg-to-foot angle;
  - a first prong defining a first proximal end opposite a first distal end,
  - wherein the first proximal end is connected to or transitioning from the first toe end at a first foot-to-prong angle;
  - a second arm defining a second upper arm end opposite a second lower arm end, wherein the second upper arm end is connected to or transitioning from the second axle end at a second axle-to-arm angle;
  - a second leg defining a second upper leg end opposite a second lower leg end, wherein the second upper leg end is connected to or transitioning from the second lower arm end at a second arm-to-leg angle;
  - a second foot defining a second heel end opposite a second toe end,
  - wherein the second heel end is connected to or transitioning from the second lower leg end at a second leg-to-foot angle;
  - a second prong defining a second proximal end opposite a second distal end, wherein the second proximal end is connected to or transitioning from the second toe end at a second foot-to-prong angle;
- wherein the plurality of hooks are pivotably attached to the plurality of brackets when the axles are disposed within their respective channels when the plurality of brackets are mounted to the underside of the ceiling;
- wherein the first and the second prongs extends upwards when the hook is pivotably hanging from the bracket when the bracket is attached to the underside of the ceiling;
- wherein the first and the second prongs are configured to removably capture a rim of the plastic storage bin;
- wherein each bracket of the plurality of brackets is identically shaped; and
- wherein each hook of the plurality of hooks is identically shaped.

20. A ceiling mounted device configured for removably storing a plastic storage bin, the ceiling mounted device comprising:
- a bracket comprising a first end opposite a second end having a channel disposed therebetween, wherein the first end and the second end mutually define a top plane configured to abut against an underside of a ceiling;
- wherein the channel is disposed below the top plane;
- wherein the channel is open towards the top plane;
- wherein the channel defines a pivot axis;
- a hook comprising an axle defining a longitudinal axis, the axle extending between a first axle end to a second axle end;
- a first arm defining a first upper arm end opposite a first lower arm end, wherein the first upper arm end is connected to or transitioning from the first axle end at a first axle-to-arm angle;
- a first leg defining a first upper leg end opposite a first lower leg end, wherein the first upper leg end is connected to or transitioning from the first lower arm end at a first arm-to-leg angle;
- a first foot defining a first heel end opposite a first toe end, wherein the first heel end is connected to or transitioning from the first lower leg end at a first leg-to-foot angle;
- a first prong defining a first proximal end opposite a first distal end, wherein the first proximal end is connected to or transitioning from the first toe end at a first foot-to-prong angle;
- a second arm defining a second upper arm end opposite a second lower arm end, wherein the second upper arm end is connected to or transitioning from the second axle end at a second axle-to-arm angle;
- a second leg defining a second upper leg end opposite a second lower leg end, wherein the second upper leg end is connected to or transitioning from the second lower arm end at a second arm-to-leg angle;
- a second foot defining a second heel end opposite a second toe end, wherein the second heel end is connected to or transitioning from the second lower leg end at a second leg-to-foot angle;
- a second prong defining a second proximal end opposite a second distal end, wherein the second proximal end is connected to or transitioning from the second toe end at a second foot-to-prong angle;
- wherein the axle is configured to pivotably attach to the bracket when the axle is disposed within the channel when the bracket is mounted to the underside of the ceiling;
- wherein the first and the second prongs extends upwards when the hook is pivotably hanging from the bracket when the bracket is attached to the underside of the ceiling;
- wherein the first and the second prongs are configured to removably capture a rim of the plastic storage bin; and
- a fastener marking tool associated with the ceiling mounted device, the fastener marking tool comprising at least one template tool having a first elongated slotted extension and at least one transverse tool having a second elongated slotted extension, wherein the at least one template tool is configured to be mounted perpendicular to the at least one transverse tool with a fastener being disposed through the first and second elongated extensions.

* * * * *